United States Patent [19]

Yanagawa et al.

[11] Patent Number: 4,900,118
[45] Date of Patent: Feb. 13, 1990

[54] MULTIPLE-FIBER OPTICAL COMPONENT AND METHOD FOR MANUFACTURING OF THE SAME

[75] Inventors: Hisaharu Yanagawa; Hirokazu Hayakawa; Mikio Ogai; Toshihiro Ochiai; Hidehisa Miyazawa, all of Ichihara, Japan

[73] Assignee: Furukawa Electric Co., Ltd., Tokyo, Japan

[21] Appl. No.: 194,525

[22] Filed: May 16, 1988

[30] Foreign Application Priority Data

| May 22, 1987 | [JP] | Japan | 62-124053 |
| Aug. 11, 1987 | [JP] | Japan | 62-199150 |
| Jan. 14, 1988 | [JP] | Japan | 63-6306 |
| Jan. 14, 1988 | [JP] | Japan | 63-6307 |
| Feb. 2, 1988 | [JP] | Japan | 63-21263 |
| Feb. 10, 1988 | [JP] | Japan | 63-27608 |
| Mar. 11, 1988 | [JP] | Japan | 63-56360 |

[51] Int. Cl.⁴ .................. G02B 6/26; H04B 9/00; B65H 69/02
[52] U.S. Cl. .................. 350/96.15; 350/96.16; 350/96.21; 370/3; 29/418; 156/158; 156/159
[58] Field of Search ............... 350/96.15, 96.16, 96.17, 350/96.20, 96.21, 96.22, 320; 370/1, 3; 29/418; 156/158, 159

[56] References Cited

U.S. PATENT DOCUMENTS

| 4,130,345 | 12/1978 | Doellner | 350/96.22 |
| 4,296,995 | 10/1981 | Bickel | 350/96.15 |
| 4,306,765 | 12/1981 | Winzer et al. | 350/96.16 |
| 4,317,699 | 3/1982 | Winzer et al. | 156/629 |
| 4,325,605 | 4/1982 | Winzer et al. | 350/96.15 |
| 4,339,290 | 7/1982 | Winzer et al. | 156/159 |
| 4,452,505 | 6/1984 | Gasparian | 350/96.15 |
| 4,498,731 | 2/1985 | Winzer et al. | 350/96.16 |
| 4,541,159 | 9/1985 | Michel et al. | 29/418 |
| 4,564,260 | 1/1986 | Dirmeyer et al. | 350/96.16 |
| 4,575,180 | 3/1986 | Chang | 350/96.16 |
| 4,589,724 | 5/1986 | Winzer | 350/96.15 |
| 4,621,895 | 11/1986 | Motsko | 350/96.21 |
| 4,730,887 | 3/1988 | Boscher et al. | 350/96.16 |
| 4,750,804 | 6/1988 | Osaka et al. | 350/96.21 |
| 4,790,616 | 12/1988 | Frenkel et al. | 350/96.15 |
| 4,802,727 | 2/1989 | Stanley | 350/96.20 |
| 4,824,204 | 4/1989 | Pafford | 350/96.21 |
| 4,826,275 | 5/1989 | Heinzman | 350/96.16 |
| 4,826,277 | 5/1989 | Weber et al. | 350/96.21 |
| 4,836,644 | 6/1989 | Eisenmann et al. | 350/96.16 |

FOREIGN PATENT DOCUMENTS

| 0037057 | 10/1981 | European Pat. Off. | 350/96.15 X |
| 0107791 | 5/1984 | European Pat. Off. | 350/96.15 X |
| 0201028 | 11/1986 | European Pat. Off. | 350/96.15 X |
| 255236 | 3/1985 | France | 350/96.15 X |
| 56-5506 | 1/1981 | Japan | 350/96.15 X |
| 62-245206 | 10/1987 | Japan | 350/96.16 X |

OTHER PUBLICATIONS

Patent Abstracts of Japan, vol. 9, No. 79(P-347)(1802), Apr. 9, 1985 & JP-A-59 210 412 (Hitachi Seisakusho K. K.), 11/29/84.
Patent Abstracts of Japan, vol. 6, No. 46 (P-107)(924), Mar. 24, 1982; & JP-A-56 161 504 (Fujitsu K. K.), 12-11-81.
A. Reichelt et al., 8217, Journal of Lightwave Tech., vol. LT-2, No. 2, Oct. 1984, N.Y. U.S.A., pp. 675–681.
M. Kawachi et al., 8080 Wescon Technical Papers, vol. 1, 8, 22, 28, Conf. Anaheim, Calif., Oct. 30–Nov. 2, 1985, N.Y., U.S.A., pp. 314, 315.
Miyauchi et al., "Compact Wavelength Multiplexer...", Optics Lett., vol. 15, No. 7, 7/80, pp. 321–322.

Primary Examiner—John D. Lee
Assistant Examiner—Brian M. Healy
Attorney, Agent, or Firm—Frishauf, Holtz, Goodman & Woodward

[57] ABSTRACT

Opposed ones of optical fibers respectively secured in a plurality of guide grooves formed in first and second blocks, are jointed to each other through an optical film formed on at least one of their opposed inclined end faces in such a way that their optical axes are aligned with each other. Further, each of optical fibers similarly disposed on a third block is formed at its one end face with a total reflection film and is arranged in parallel to the optical fibers of the first and second blocks in such a way that an optical signal incident to the respective fibers of the first block is propagated through the splitting films and total reflection films along optical axes of the associated optical fibers of the third block.

38 Claims, 19 Drawing Sheets

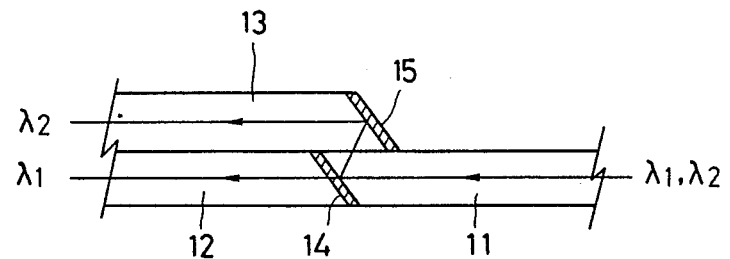
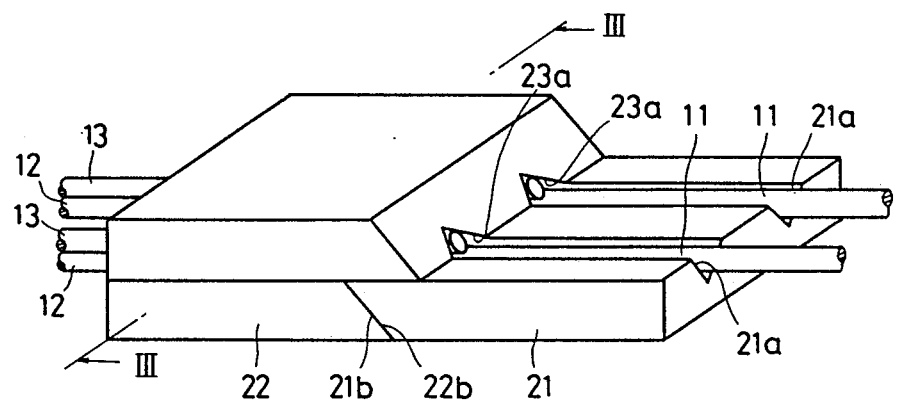
FIG. 2
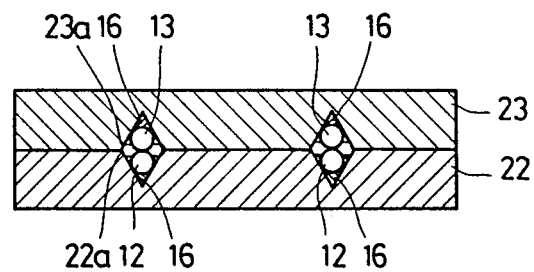
FIG. 3

MULTIPLE-FIBER OPTICAL COMPONENT AND METHOD FOR MANUFACTURING OF THE SAME

BACKGROUND OF THE INVENTION

The present invention relates to a multiple-fiber optical component suitable for use with multiple optical fibers and having various functions and a method for manufacturing the same with ease and with a high accuracy.

Recently, with development of multiple-fiber optical cables, such as a ribbon fiber and improvement of wavelength division multiplexing technique and the like, the importance of multiple-fiber wavelength division multiplexers/demultiplexers, multiple-fiber optical couplers/splitters, and the like is significantly increased.

Conventionally, to form multiple-fiber optical components, a desired number of optical components are juxtaposed to each other, each with a single-fiber structure having a branch-path optical fiber obliquely spliced to a straight-path optical fiber, and a multiple-fiber optical connector. However, production of the conventional optical components having optical fibers obliquely spliced together needs, for instance, a jig for various axial alignments in the course of assembly of the components, so that these components are not so desirable as multiple-fiber optical components. Further, in a multiple-fiber optical system, multiple-fiber to single-fiber conversion is required for transmission of optical signals between a multiple-fiber ribbon and a single fiber. What is more, conventionally, a wavelength division multiplexing/demultiplexing process for an optical signal with more than two wavelengths needs two or more optical components, and a change in the operating wavelength necessitates a complete replacement of the optical components. In this regard, the conventional multiple-fiber optical components are inconvenient in designing optical systems.

OBJECTS AND SUMMARY OF THE INVENTION

It is an object of this invention to provide a multiple-fiber optical component designed to ensure axial alignment of optical fibers with ease and to prevent insertion loss due to axial misalignment of fibers, and a method for manufacturing the same.

It is another object of this invention to provide a multiple-fiber optical component suitable for use with a multiple optical fibers and a method for manufacturing the same accurately with a simple process.

It is a further object of this invention to provide an optical component which can be provided with a wavelength division multiplexing/demultiplexing function and permits alternation of the operating wavelength as desired, and hence which is convenient in designing an optical system and is inexpensive.

It is a further object of this invention to provide a compact and inexpensive multiple-wavelength and multiple-fiber wavelength division multiplexer/demultiplexer for optical signals with multiple-wavelengths.

It is a further object of this invention to provide a multiple-fiber optical component with a function for conversion between a multiple-fiber ribbon and a single fiber and a method for manufacturing the same.

It is a further object of this invention to provide a multiple-fiber optical component having a built-in multiple-fiber/single-fiber conversion unit and a multiple-fiber/single-fiber conversion function.

It is a still further object of this invention to provide a method for manufacturing a multiple-fiber optical component, which reduces occurrence of defects due to variation in the length of an optical fiber disposed in a case of the multiple-fiber optical component to thereby improve the yield and eliminates the need for an otherwise troublesome process for matching the lengths of optical fibers in use.

According to one aspect of this invention, there is provided an optical component, which comprises at least first through third blocks having a plurality of parallel guide grooves formed on each of their surfaces, an optical fiber being placed and fixed in each of the guide grooves and having an inclined face at one end, the optical fibers of the first and second blocks having their inclined faces or slant ends jointed together through a first optical film in such a way that their optical axes are aligned with each other, the optical fiber of the third block having a second optical film formed on the one end face and being disposed in such a way that its optical axis is in parallel to the optical axes of the optical fibers of the first and second blocks and when an optical signal incident to the optical fiber of the first block is successively reflected at the first and second optical films, the optical signal is propagated along the optical axis of the optical fiber of the third block.

According to another aspect of this invention, there is provided a method for manufacturing an optical component, which comprises the steps of forming a plurality of parallel optical fiber guide grooves and at least one alignment-pin guide groove in each of surfaces of at least first through third block members, to obtain at least first through third blocks; placing and fixing optical fibers in the respective optical fiber guide grooves of the first to third blocks; obliquely polishing or lapping one end of each of the first to third blocks together with the optical fibers placed thereon to thereby form an inclined face; forming a first optical film on the inclined face of at least one of the first and second blocks and then arranging the first and second blocks in such a way that when an optical signal incident to the optical fiber of the first block passes through the first optical film, the optical signal is propagated to the optical fiber of the second block; forming a second optical film on the inclined face of the third block and then arranging the third block in such a way that an optical axis of the optical fiber of the third block is in parallel to optical axes of the optical fibers of the first and second blocks and when an optical signal incident to the optical fiber of the first block is successively reflected at the first and second optical films, the optical signal is propagated to the optical fiber of the third block; and disposing a common alignment pin in the alignment-pin guide grooves respectively formed in the first to third blocks and fitting and fixing the first to third blocks together by the common alignment pin.

According to a further aspect of this invention, there is provided a multiple-fiber optical component which comprises a first substrate formed on its surface with a plurality of parallel guide grooves and a slit crossing the guide grooves and extending from the surface of the first substrate to an opposite surface thereof at a predetermined angle. An optical film is fitted in the slit, and a straight-path optical fiber is placed and fixed in each of the guide grooves in such a way that optical axes of both sides of the fiber with respect to the optical film interposed therebetween are aligned with each other. Further, a branch-path optical fiber, placed and fixed in a respective one of parallel guide grooves formed in a surface of a second substrate, is disposed in contact with an outer periphery or circumference of an associated one of the straight-path optical fibers in such a way that when an incident optical signal to a respective one of the straight-path optical fibers is reflected at the optical film, the optical signal is propagated along the optical axis of an associated one of the branch-path optical fibers.

According to a further aspect of this invention, there is provided a method for manufacturing a multiple-fiber optical component, which comprises the steps of forming a plurality of parallel shallow guide grooves on a first plate at a substantially middle portion of its surface, to obtain a first substrate; disposing and fixing a straight-path optical fiber in each of the guide grooves; forming a slit crossing the straight-path optical fibers and extending from the surface of the first substrate to an opposite surface thereof at a predetermined angle; fitting and fixing an optical film in the slit; disposing and fixing branch-path optical fibers in a plurality of parallel guide grooves formed in a surface of a second substrate obtained from a second plate; and arranging a respective one of the branch-path optical fibers in contact with an outer periphery of an associated one of the straight-path optical fibers in such a way that when an incident optical signal to a respective one of the straight-path optical fibers is reflected at the optical film, the optical signal is propagated along the optical axis of an associated one of the branch-path optical fibers.

According to a further aspect of this invention, there is provided an optical component which comprises a first substrate with an optical fiber disposed and fixed on a surface thereof in its lengthwise direction, an optical film fittedly fixed in a slit crossing the optical fiber and extending from the surface of the first substrate to an opposite surface thereof at a first predetermined angle, so as to be adapted to be jointed to an external optical component, and an alignment pin for axial alignment which is disposed on the surface of the first substrate in the lengthwise direction thereof, and, preferably, in parallel with the optical fiber, so as to be adapted to be fitted to the external optical component. Further, an optical component is provided, which comprises a second substrate with an optical fiber disposed and fixed on a surface thereof in its lengthwise direction, an optical film fittedly fixed in a slit crossing the optical fiber and extending from the surface of the second substrate to an opposite surface thereof at a first predetermined angle, so as to be joinable to an external optical component, and an alignment-pin guide groove provided on the surface of the second substrate in the lengthwise direction thereof, and, preferably, in parallel with the optical fiber, so as to be adapted to receive an alignment pin, for axial alignment, of an external optical component. Furthermore, there is provided an optical component which comprises a third substrate with an optical fiber disposed and fixed on a surface thereof in its lengthwise direction, a total reflection film fittedly fixed in a slit crossing the optical fiber and extending from the surface of the third substrate to an opposite surface thereof at a second predetermined angle, so as to be joinable to an external optical component and an alignment-pin guide groove provided on the surface of the third substrate in the lengthwise direction thereof, and, preferably, in parallel with the optical fiber, so as to be adapted to receive an alignment pin, for axial alignment, of the external optical component.

According to a further aspect of this invention, there is provided a multiple-wavelength multiple-fiber type of wavelength division multiplexer/demultiplexer which comprises a common substrate for straight-path, formed with a plurality of parallel optical fiber guide grooves provided on its surface in a lengthwise direction thereof in which straight-path optical fibers are disposed and fixed, and a plurality of straight-path optical films with different characteristics being fittedly fixed respectively in a plurality of slits provided on the surface of the common substrate, each crossing the straight-path optical fibers and extending from the surface thereof to an opposite surface thereof at a predetermined angle, each of branch-path substrates is formed at its surface with a plurality of parallel optical fiber guide grooves formed in a lengthwise direction thereof. Branch-path optical films with different characteristics are fittedly fixed in slits respectively formed on the surfaces of the branch-path substrates so as to cross the optical fibers and extend from the surfaces thereof to opposite surfaces thereof at predetermined angles at which the slits of the common substrate extended. The branch-path substrates are disposed in contact with and fixed to the straight-path common substrate in such a way that the straight-path optical films of the common substrate are optically aligned with the optical films of the branch-path substrates in association of the characteristics of the branch-path optical films with the characteristic of the straight-path optical films.

According to a further aspect of this invention, there is provided a multiple-fiber optical component with a multiple-fiber/single-fiber conversion function, which comprises a main body having two or more input/output ports for executing a multiple-fiber/single-fiber conversion, and at least one single-fiber input/output means and multiple-fiber input/output means provided at the input/output ports of the main body, and a method for manufacturing the same.

According to a further aspect of this invention, there is provided a multiple-fiber optical component with a multiple-fiber/single-fiber conversion function, which comprises a multiple-fiber optical component with two or more multiple-fiber input/output ports, and a multiple-fiber/single-fiber conversion component, coupled to at least one of the multiple-fiber input/output ports, for executing a multiple-fiber/single-fiber conversion. The multiple-fiber/single-fiber conversion component includes N (=2, 3, 4, . . .) single fibers having different terminations at both ends, the respective one of terminations of these fibers being attached together to an N-fiber ferrule at one end and the respective one of the other terminations of these fibers consisting of at least one of a single fiber and/or a single-fiber ferrule connected to a single fiber at the other end.

According to a further aspect of this invention, there is provided a method for manufacturing a multiple-fiber optical component having a main body and an input/output connector to be coupled to the main body, which method comprises the steps of forming a bottom substrate portion of the main body and an input/output connector portion on a common substrate; disposing and fixing optical fibers to the input/output connector portion; disposing and fixing free end portions of the optical fibers to the bottom substrate portion without bending the free end portions; and executing a necessary process to the bottom substrate portion to form a bottom portion of the main body.

The above-mentioned optical film may consist of an element selected from a group consisting of wavelength selective film, splitting film, total reflection film, the above-mentioned film with transparent substrate and the like, in accordance with a kind of an intended optical component to which this invention is applied.

The above objects and other object as well as other features and advantages of this invention will become more apparent from the following detailed description given with reference to the accompanying drawings.

BRIEF DESCRIPTION OF THE DRAWINGS

FIG. 1 is a diagram illustrating the conceptual structure of one unit of a two-fiber wavelength division multiplexer/demultiplexer according to a first embodiment of this invention;

FIG. 2 is a perspective view of a multiple-fiber type of wavelength division multiplexer/demultiplexer;

FIG. 3 is a cross section as taken along the line III—III in FIG. 2;

DETAILED DESCRIPTION

Before going into an explanation of a multiple-fiber optical component of this invention, a conventional optical component will be explained.

Figure 7:
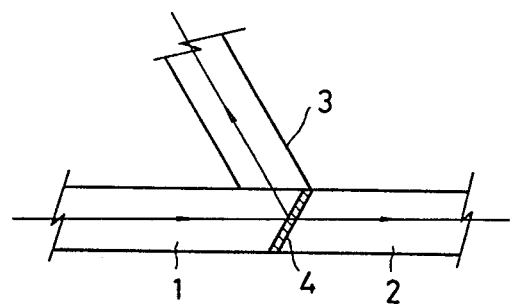
FIG. 7 is a diagram illustrating the conceptual structure of one unit of a conventional multiple-fiber optical component.

Conventionally, a multiple-fiber optical component such as a multiple-fiber wavelength division multiplexer/demultiplexer or a multiple-fiber optical coupler/splitter, is generally composed of a plurality of units which are juxtaposed to each other in the direction vertically of the sheet (FIG. 7), each consisting of a wavelength multiplexer/demultiplexer or an optical coupler/splitter, with a single-fiber structure as shown in FIG. 7. In FIG. 7, the single unit for the multiple-fiber optical component comprises optical fibers 1, 2 and 3 each having its one end face obliquely polished, with the optical fibers 1 and 2 being spliced to each other at their polished end faces through an optical film 4 and the optical fiber 3 being spliced to sides of the fibers 1 and 2 in such a manner that when an optical signal incident to the fiber 1 is reflected at the optical film 4, it enters the fiber 3. With the above structure, if the optical film 4 is a splitting film, the unit serves as an optical coupler/splitter, and if the film 4 is a wavelength selective film, the unit serves as a wavelength division multiplexer/demultiplexer.

Figure 8:
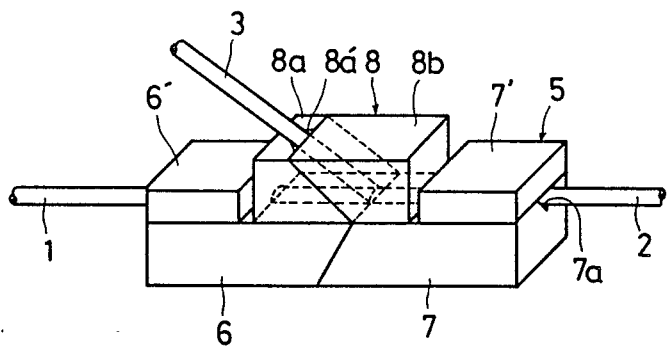
FIG. 8 is a perspective view illustrating the multiple-fiber optical component unit of FIG. 7 assembled according to the conventional method.

The conventional multiple-fiber optical component has a three-dimensional structure which has these units arranged in parallel at predetermined intervals. Manufacturing this multiple-fiber optical component requires axial alignment of the individual optical fibers. A jig for the alignment has been proposed, which comprises several blocks as shown in FIG. 8. The same reference numerals as used in FIG. 7 are used to specify identical or corresponding elements in FIG. 8. A jig 5 is for producing a respective one of the above units and comprises blocks 6, 7 and 8. The blocks 6 and 7, which receive the optical fibers 1 and 2, have V-shaped grooves 7a formed on their tops (only the one on the block 7 side being illustrated). After the optical fibers 1 and 2 are disposed in the respective grooves, holding blocks 6' and 7' are mounted and fixed on the respective blocks 6 and 7. The block 8, disposed between the holding blocks 6' and 7', consists of two block halves 8a and 8b which are obtained by cutting a block member at an angle to be defined by the optical fiber 3 and the optical fibers 1 and 2. One of the block halves, for example, 8a, has a guide groove 8a' formed for securing the optical fiber 3, while the other block 8b serves as a holding block.

In applying the jig 5 to manufacturing the aforementioned multiple-fiber optical component, the axial alignment of the optical fibers of each unit is performed, with the individual optical fibers disposed and secured to the jig 5, to obtain a finished unit, and hence these finished units may be put together to provide the component.

With the use of such a jig, however, as it includes an oblique axis as formed by the optical fiber 3, it is necessary to execute axial alignment for rotation and parallel alignment of the individual optical fibers in addition to axial alignment in the X-, Y- and Z-axial directions. This significantly complicates the assembling process and thus makes it significantly difficult to apply the jig to production of multiple-fiber optical components.

FIGS. 1 and 2 illustrate a two-fiber wavelength division multiplexer/demultiplexer according to the first embodiment of this invention. FIG. 1 illustrates the arrangement of the individual optical fibers in one unit of the two-fiber wavelength division multiplexer/demultiplexer, in which optical fibers 11 and 12 having their free ends obliquely polished are spliced in such a way that their optical axes are aligned straight through a wavelength selective film 14. An optical fiber 13 has its free end obliquely polished or lapped and has a total reflection film 15 formed on the polished end, and the fiber 13 is jointed to the sides of the fibers 11 and 12 in such a way that its optical axis is in parallel to the axes of the fibers 11 and 12 and when an incident optical signal to the fiber 11, as indicated by the arrow, is successively reflected at the wavelength selective film 14 and the total reflection film 15, the optical signal is propagated along the optical axis of the fiber 13.

In the above arrangement, the wavelength selective film 14 may be constituted by a dielectric multilayered film deposited on the end face of the optical fiber 11 or 12 through evaporation, so that an optical signal with a wavelength $\lambda 1$ is passed therethrough and an optical signal with a wavelength $\lambda 2$ is reflected by the film. The total reflection film 15 is arranged to cause total reflection of an optical signal with the wavelength $\lambda 2$. When optical signals with the wavelengths $\lambda 1$ and $\lambda 2$ are incident to the optical fiber 11, therefore, the signal with the wavelength $\lambda 1$ passes through the wavelength selective film 14 and enters the optical fiber 12 while the other signal with the wavelength $\lambda 2$ is reflected at the filter 14 first and then at the total reflection film 15 and enters the fiber 13, thereby demultiplexing two optical signals with different wavelengths.

FIG. 2 illustrates the overall structure of the above-mentioned two-fiber wavelength division multiplexer/demultiplexer, in which a block 21, having the optical fibers 11 disposed and secured in guide grooves 21a, and a block 22, having the optical fibers 12 disposed and secured in guide grooves (not shown), are butt-jointed at their inclined faces 21b and 22b and a block 23, having the optical fibers 13 disposed and secured in guide grooves 23a, is jointed at its bottom to the tops of the blocks 21 and 22.

FIG. 3 illustrates the cross section of the optical component of FIG. 2 along the line perpendicular to the optical axes of the optical fibers. As illustrated, the guide grooves 22a of the block 22 and the guide grooves 23a of the block 23 are formed such that their associated edge portions are completely aligned with each other. As the guide grooves 21a of the block 21 are the same as the guide grooves 22a and 23a, their explanation will be omitted. The optical fibers 12 and 13 are disposed in the respective guide grooves 22a and 23a and secured by adhesives 16. It is desirable that each of the guide grooves 22a and 23a has such a cross section that when the optical fibers 12 and 13 are disposed in the grooves, the outer peripheries of the fibers 12 and 13 are flush at their radially outermost locations with the surfaces of the blocks 22 and 23. With this arrangement, when the blocks 22 and 23 are jointed, their surfaces are brought into contact with each other so that the outer surfaces of opposing optical fibers also would have a line contact along the optical axis direction, thus improving the overall mechanical strength. If the guide grooves 22a and 23a are much deeper than the outer diameters of the optical fibers 12 and 13, unlike what is shown in FIG. 3, there would be a gap between the opposing fibers 12 and 13 when the blocks 22 and 23 are jointed together, this gap causing radiation loss. On the other hand, if the guide grooves 22a and 23a are too shallow with respect to the outer diameters of the fibers 12 and 13, the surfaces of the blocks 22 and 23 would not contact each other, with only the fibers 12 and 13 having a line contact to each other in the optical axial direction, in jointing the blocks 22 and 23 together. The overall structure therefore becomes mechanically unstable.

Figure 4:
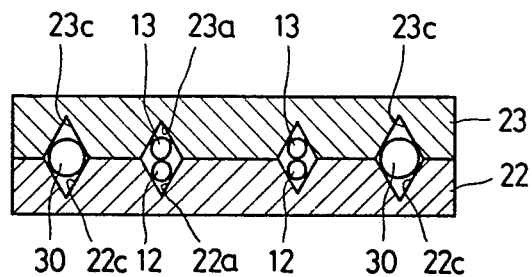
FIG. 4 is a cross section of another arrangement as taken along the line III—III in FIG. 2.

It is also desirable that, as shown in FIG. 4 (only blocks 22 and 23 being illustrated), the individual blocks 21-23 have guide grooves 21c-23c (only the grooves 22c and 23c are shown) of, for example, a V cross section, for receiving alignment pins 30, which are common to these blocks and by which the individual blocks are fitted together.

Figure 5:
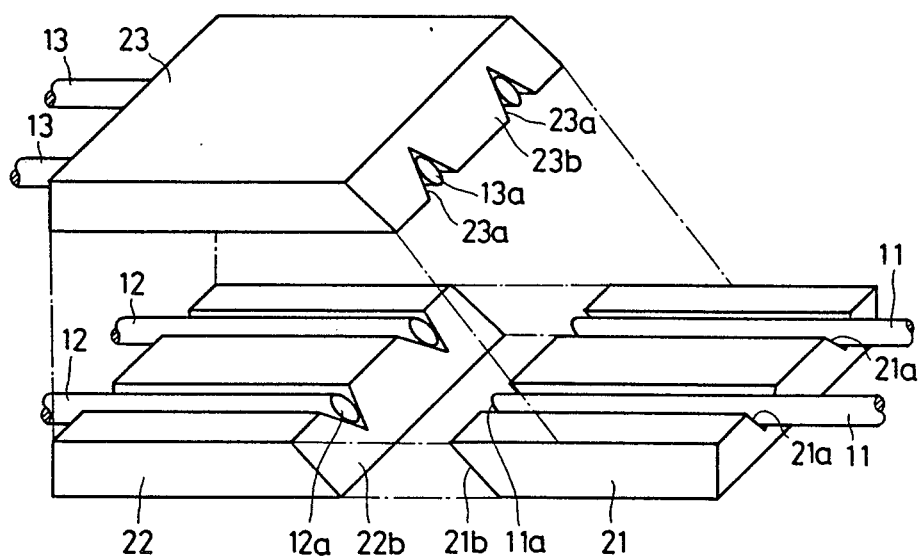
FIG. 5 is an exploded perspective view of FIG. 2.

FIG. 5 is an exploded illustration of the two-fiber wavelength division multiplexer/demultiplexer of FIG. 2. In the surface of the first block 21 are two parallel guide grooves 21a of, for example, a V-shape, formed at a predetermined interval therebetween for receiving and securing the optical fibers 11. Similarly, two parallel guide grooves 22a for receiving and securing the optical fibers 12 and two parallel guide grooves 23a receiving and securing the optical fibers 13 are formed respectively in the surfaces of the blocks 22 and 23 at the same interval therebetween as that of the guide grooves 21a. The polished inclined end faces 11a, 12a and 13a of the optical fibers 11-13 and the end faces 21b, 22b and 23b of the blocks 21-23 on which these fibers 11-13 are secured are designed so as to be flush with each other. The end face of either the optical fiber 11 or 12, for example, the end face 11a, has a wavelength selective film deposited thereon through evaporation and the end face 13a of the optical fiber 13 has a total reflection film formed thereon. The blocks 21 and 22 are butt-jointed at their end faces 21b and 22b and at the same time, the optical fibers 11 and 12 are butt-jointed at their end faces 11a and 12a. The block 23 is securely jointed to the blocks 21 and 22, with its bottom closely contacting with the tops of the blocks 21 and 22.

When the individual blocks with the associated optical fibers secured thereon are jointed together in the above manner, as the fibers 11-13 constitute the individual units of the wavelength division multiplexer/demultiplexer shown in FIG. 1, a two-fiber wavelength division multiplexer/demultiplexer can be provided as a consequent.

The following explains an example of a process for manufacturing the above two-fiber wavelength division multiplexer/demultiplexer to which the manufacturing method of this invention is applied.

Figure 6:
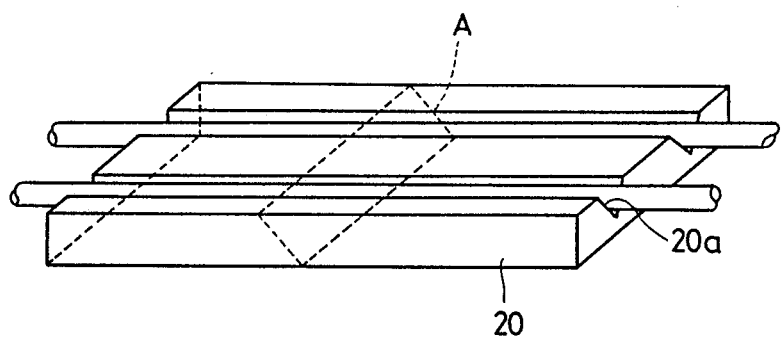
FIG. 6 is a view illustrating a process in a method of producing a multiple-fiber type of wavelength division multiplexer/demultiplexer of the present invention.

First, parallel fiber guide grooves 21-23, two each, and parallel pin guide grooves 21c-23c, also two each, are formed in the surfaces of the first to third blocks 21-23, and the optical fibers 11-13 are disposed in the respective guide grooves 21a-23a and secured there by adhesives (see FIGS. 3 and 4). Then, one end of each block, 21b, 22b and 23b, is obliquely cut together with its associated fibers and then polished. It is desirable that this step is executed using a micro-lapping technique which ensures simultaneous cutting and polishing. In this step, if one continuous block member 20 having two parallel guide grooves 20a formed as shown in FIG. 6 is subjected to the micro-lapping process to be cut and polished at its proper section along the face indicated by the broken line A in FIG. 6 to be thereby separated into the first and second blocks 21 and 22, these blocks 21 and 22 can be completely fitted together, thus preventing insertion loss due to a axial misalignment.

In the next step, as shown in FIG. 4, the alignment pins 30 are fitted in the respective pin guide grooves 21c-23c (only 22c and 23c being illustrated) of the blocks 21-23 (only 22 and 23 being illustrated) and the blocks are aligned in position with each other and then secured. At this time, axial alignment of the optical fibers 11-13 disposed and secured on the respective blocks 21-23 can be done by shifting the blocks back and forth along the alignment pins 30. This is advantageous in that a process for the necessary axial alignment of the optical fibers is significantly simplified. The alignment pins 30 may be fitted in pin guide grooves formed in a micropositioner of a micro-lapping machine (not shown) so as to provide reference positions for block alignment in the block cutting step.

Although the above embodiment has been described with the two-fiber wavelength division multiplexer/demultiplexer constituted by three blocks, the number of the blocks is not specifically limited thereto and may be properly selected in accordance with the structure of the multiple-fiber optical component.

Figure 9:
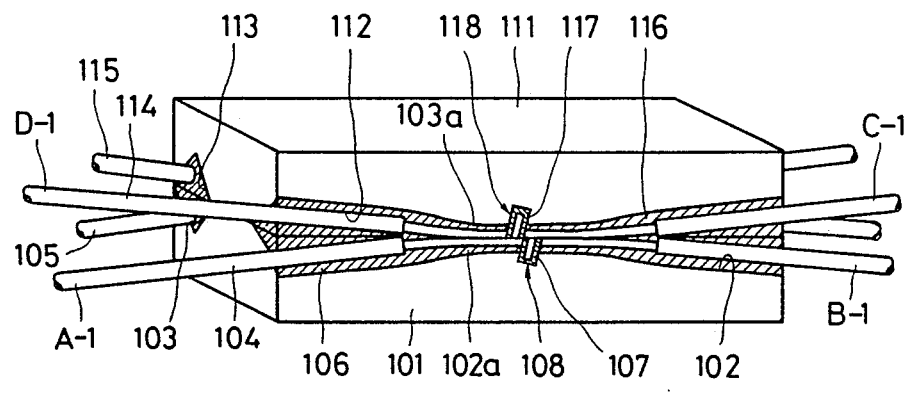
FIG. 9 is a partially cross-sectional perspective view of a two-fiber wavelength division multiplexer/demultiplexer according to a second embodiment of this invention.

FIG. 9 illustrates a two-fiber wavelength division multiplexer/demultiplexer according to the second embodiment of this invention, in which parallel guide grooves (V grooves) 102 and 103 are formed in the surface of a straight-path substrate 101. The guide grooves 102 and 103 are formed in such a way as to be shallower in substantially center portions 102a and 103a in their lengthwise directions, and in these grooves are respectively disposed optical fibers 104 and 105 for straight-path, each having an unsheathed or bare optical fiber portion at its middle portion. The optical fibers 104 and 105 are secured in the grooves by, for example, optical adhesives 106. A slit 107 (only that portion on the groove 102 side being illustrated) is formed at the center portions 102a and 103a of the guide grooves 102 and 103 in the width direction of the substrate 101 at a predetermined angle with respect to the lengthwise direction of the grooves 102 and 103, and a wavelength selective film 108 is fitted in the slit 107.

As the guide grooves 102 and 103 have the same structure, the structure of the former groove 102 will now be explained. In actuality, the wavelength selective film 108 comprises a transparent substrate 108a, such as glass, formed with a wavelength selective film 108b through evaporation. In this connection, the term "wavelength selective film" will be used hereinbelow to refer not only to just the film evaporated directly on the end face of fibers but also to the above-mentioned type of film including the transparent substrate. In the same way, a splitting film, total reflecting film and the like are also used to refer to the film including the transparent substrate. The straight-path optical fiber 104 is subjected to optical axial alignment in such a manner that its optical axis on one side of the film 108 is aligned with the axis on the other side thereof.

Figure 10:
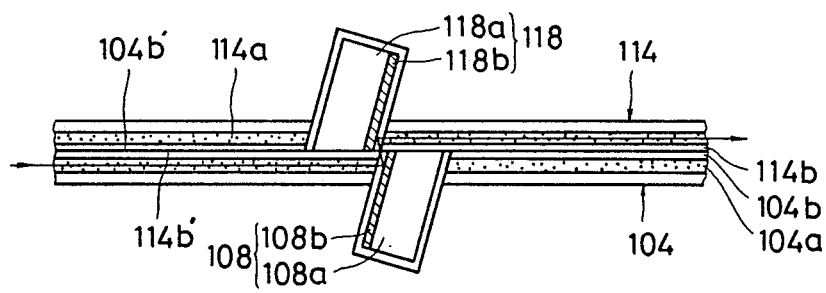
FIG. 10 is a partially enlarged cross-sectional view of FIG. 9.

Further, the outer periphery of the straight-path optical fiber 104 has its side polished at a region where the wavelength selective film 108 is held. More specifically, the fiber 104 comprises a core 104a and a clad 104b, as shown in FIG. 10, and the top portion of the clad 104b is polished up to its radial region short of the core 104a so that the polished face 104b' is flush with or forms the same plane with the top of the straight-path substrate 101.

A substrate 111 for branch-path is disposed and secured on the top of the straight-path substrate 101, and has the same structure as the substrate 101. More specifically, optical fibers 114 and 115 for branch-path having bare fiber portions are disposed and secured in the guide grooves 112 and 113 by optical adhesives 116, and a wavelength selective film 118 is fittedly secured in a slit 117. As illustrated in FIG. 10, at the branching section of this wavelength division multiplexer/demultiplexer, the straight-path optical fiber 104 and branch-path optical fiber 114 have their polished faces 104b' and 114b' formed on the clads 104b and 114b, and these polished faces 104b' and 114b' are closely jointed. The axial positions of the wavelength selective films 108 and 118 of the substrates 101 and 111 are adjusted along the optical axes of the optical fibers 104 and 114 in such a way that when an optical signal incident to the fiber 114 from, for example, a port A-1, is successively reflected at the wavelength selective films 108 and 118, the signal is propagated to a port C-1 of the fiber 114.

With the above arrangement, given that wavelength selective films of a kind passing an optical signal with wavelength λ1 and reflecting an optical signal with wavelength λ2 are used as the wavelength selective films 108 and 118 and that optical signals with wavelengths λ1 and λ2 are simultaneously incident to the straight-path optical fiber 104 from the port A-1, the signal with wavelength λ1 penetrates the film 108 and goes through a port B-1 of the fiber 104. Meanwhile, the signal with wavelength λ2 is successively reflected at the wavelength selective films 108 and 118 and is propagated through the port C-1 of the branch-path optical fiber 114. The demultiplexing of the wavelengths is executed in this manner.

If optical signals with wavelengths λ1 and λ2 are respectively incident from the ports B-1 and C-1, respectively, the optical signals with wavelengths λ1 and λ2 go through the port A-1. That is, the multiplexing of the wavelengths is executed.

In the case that the optical component of FIG. 9 is utilized solely for wavelength division multiplexing-/demultiplexing, a port D-1 of the branch-path optical fiber 114 is unused. If a splitting film for splitting an optical signal having a predetermined wavelength with a predetermined splitting ratio is employed instead of the wavelength selective film 108, and a total reflection film is substituted for the film 118, the multiple-fiber optical component thus produced serves as an optical coupler/splitter.

The method for manufacturing a two-fiber wavelength division multiplexer/demultiplexer will be explained below.

Figure 11:
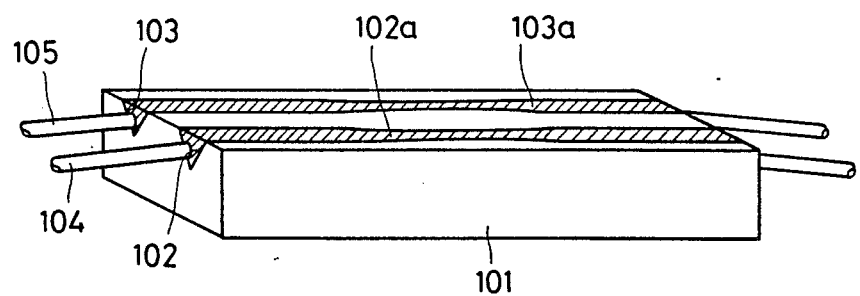
FIGS. 11 through 13 are cross sections illustrating processes for manufacturing a multiple-fiber optical component of this invention.
Figure 12:
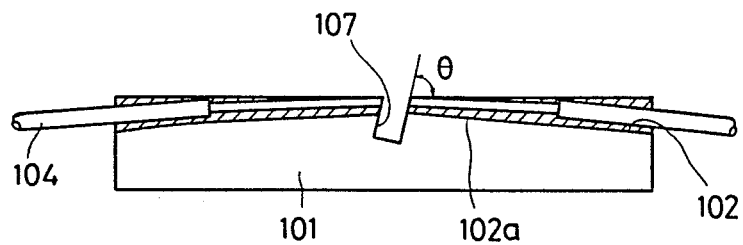
Figure 13:
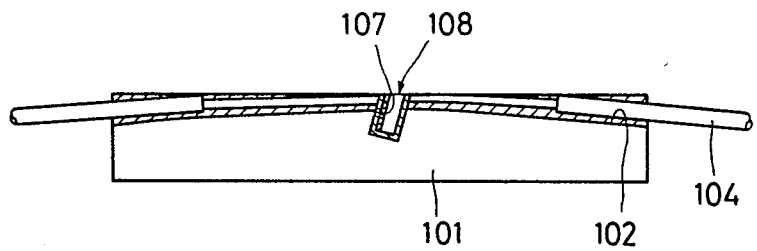

First, two parallel guide grooves 102 and 103 are formed on the straight-path substrate 101 (FIG. 11). These grooves 102 and 103 are shallow at substantially center portions 102a and 103a in the lengthwise direction thereof, as shown in FIG. 12. The straight-path optical fibers 104 and 105 are disposed in the respective guide grooves 102 and 103 and are secured there by optical adhesives 106. Then, the slit 107, which crosses the individual fibers 104 and 105 and has a predetermined angle θ (rad) with respect to the surface of the substrate 101, is formed in the surface thereof (FIG. 12). The slit 107 is formed by grinding the surface of the substrate 101 over the entire width together with the optical fibers 104 and 105.

The filter chip 108 is fitted in thus formed slit 107 and secured by an optical adhesive, and the surface of the substrate 101 is polished and the clads of the optical fibers 104 and 105 corresponding to the substantially center portions 102a and 103a of the guide grooves 102 and 103 are polished up to these regions which are immediately before the associated cores. The branch-path substrate (shown in FIG. 9) having the same structure as the substrate 101 is separately prepared, and is overlaid up-side down on the substrate 101 so that the the polished faces of the associated optical fibers are brought into closed contact with each other. This completes the two-fiber wavelength division multiplexer/demultiplexer as shown in FIG. 9.

Figure 14:
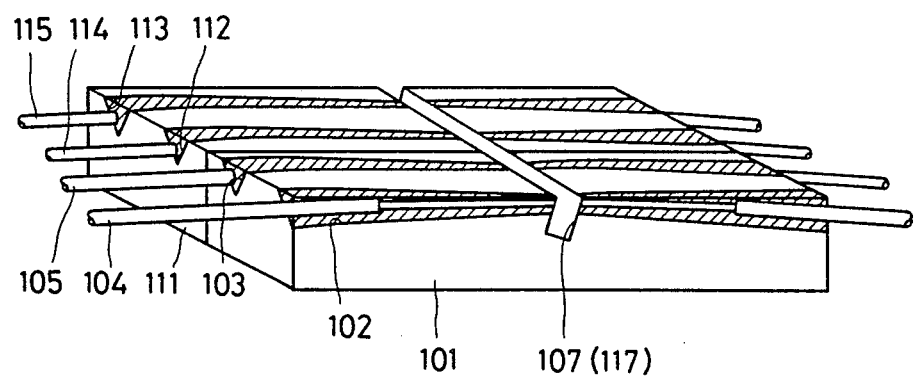
FIG. 14 is a partially cross-sectional detailed perspective view of a slit forming process shown in FIG. 12.

In the above step, in forming the slits 107, arranging the straight-path substrate 101 and branch-path substrate 111 side by side and forming the slits 117 at the same time as shown in FIG. 14 improves the workability and reduces an angle deviation ($\Delta\ \theta$) compared to that caused by separate formation of the slits, and further the resultant angle deviation can be easily compensated by sliding the optical fibers in the lengthwise direction at the time of axial alignment done when overlapping these substrates.

Figures 15, 16:
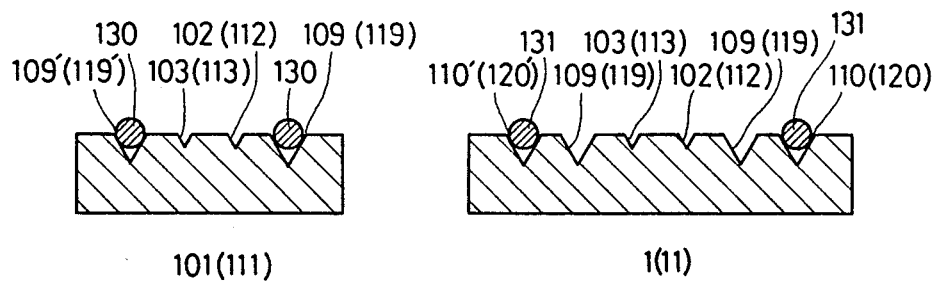
FIGS. 15 and 16 are cross sections illustrating alignment pins disposed in alignment-pin guide grooves and connector guide grooves respectively formed in a straight-path substrate and a branch-path substrate.

Further, as shown in FIG. 15, if alignment-pin guide grooves 109 and 109' (119 and 119') are formed in addition to the guide grooves 102 in the surfaces of the substrates 101 (111) and 103 (112 and 113), and alignment pins 130 are fitted in these alignment-pin guide grooves 109 and 109' (119 and 119'), the axial alignment in the jointing step after polishing the surfaces of the substrates 101 and 111 can be easily executed by, for example, sliding the substrate 111 along the alignment pins 130 in the lengthwise direction of the optical fibers.

Furthermore, if, in addition to the guide grooves 109 and 109' (119 and 119'), connector guide grooves 110 and 110' (120 and 120') are formed in the surfaces of the substrates 101 and 111 and connector guide pins 131 are fitted in these guide grooves 110 and 110' (120 and 120'), as shown in FIG. 16, this wavelength division multiplexer/demultiplexer can be easily coupled directly to a multi-fiber connector with alignment pins.

Figure 17:
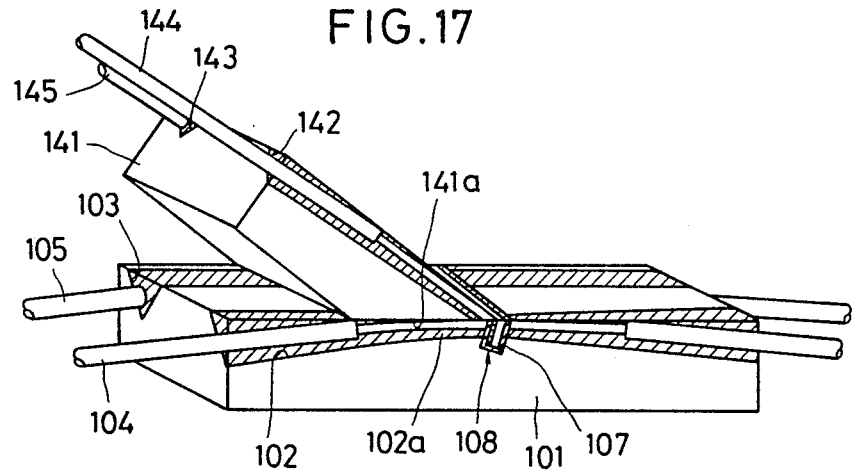
FIGS. 17 and 18 are partially cross-sectional perspective views of two-fiber wavelength division multiplexers/demultiplexers according to third and fourth embodiments of this invention.
Figure 18:
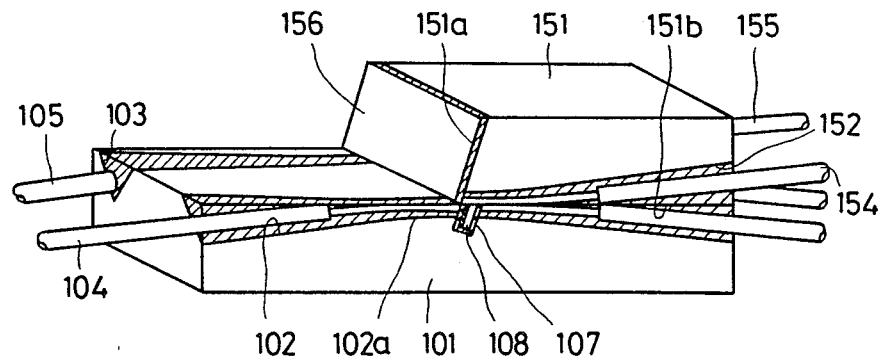

FIGS. 17 and 18 illustrate two-fiber wavelength division multiplexers/demultiplexers according to the third and fourth embodiments of this invention, which have different structures in a branch-path substrate than the one shown in FIG. 9. In these figures, the same reference numerals as used in FIG. 9 are used to denote identical or corresponding elements.

The two-fiber wavelength division multiplexer/demultiplexer according to the third embodiment as shown in FIG. 17 is produced by disposing and securing branch-path optical fibers 144 and 145 in guide grooves 142 and 143 formed in a branch-path substrate 141, obliquely cutting the substrate 141 together with the optical fibers 144 and 145 at a predetermined angle and polishing them to thereby form an inclined face 141a, and performing the axial alignment in such a manner that the inclined face 141a is brought into closed contact with the surface of the straight-path substrate 101. When an optical signal coming through the port A-1 of the straight-path optical fiber 104 is reflected at the wavelength selective film 108, the signal is propagated along the optical axis of the branch-path optical fiber 144.

The two-fiber wavelength division multiplexer/demultiplexer with the above arrangement is slightly larger in size than the two-fiber wavelength division multiplexer/demultiplexer shown in FIG. 9, but it has a significantly low radiation loss due to end separation at the proximity of the wavelength selective film 108.

The two-fiber wavelength division multiplexer/demultiplexer according to the fourth embodiment as shown in FIG. 18 has guide grooves 152 and 153 (only 152 being illustrated) on the surface of the branch-path substrate 151 and branch-path optical fibers 154 and 155 secured in the guide grooves 152 and 153. This substrate 152 has its one end obliquely cut together with the optical fibers 151 and 155 at the same angle as that of the slit 107 and has a wavelength selective film 156 formed on the entire inclined end face 151a through evaporation. The end face 151a of the branch-path substrate 151, arranged for close contact with the straight-path substrate 101, like the surface thereof, is polished up to that region which is short of the cores of the branch-path optical fibers 154 and 155. These substrates 101 and 151 are subjected to optical axial alignment in such a manner that the polished faces of the associated straight-path and branch-path optical fibers 104 and 154 are closely attached and when an optical signal coming through the port A-1 of the fiber 104 is successively reflected at the wavelength selective films 108 and 156, it is propagated through the port C-1 of the fiber 154.

Figure 19:
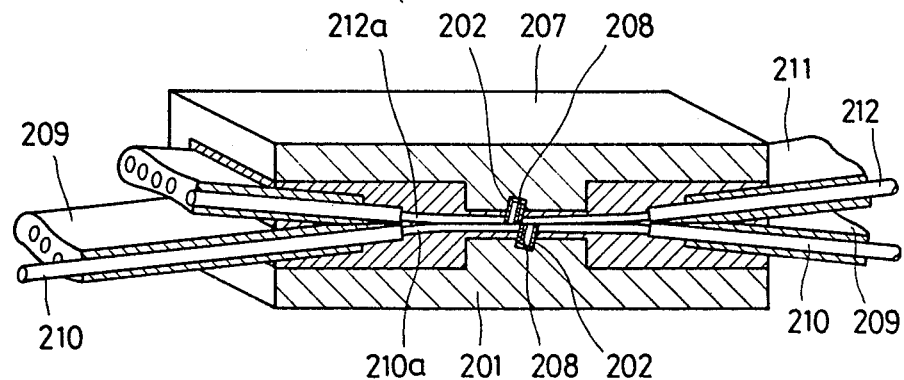
FIG. 19 is a partially cross-sectional view of a modification of the two-fiber wavelength division multiplexer/demultiplexer of FIG. 9.
Figure 20:
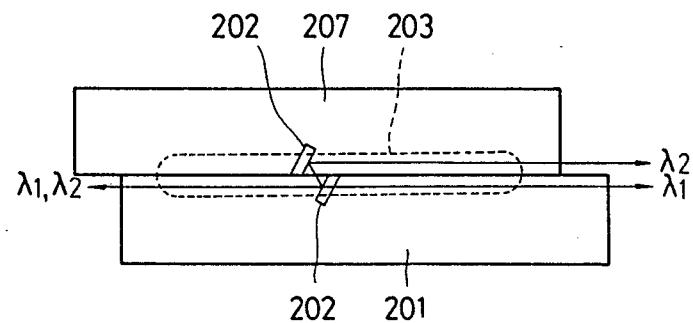
FIG. 20 is a diagram for explaining the operation of the optical component of FIG. 19.

FIG. 19 illustrates a modification of the two-fiber wavelength division multiplexer/demultiplexer according to the second embodiment shown in FIG. 9. This modification uses a straight-path multiple-fiber ribbon 209 including a plurality of optical fibers 210 and a branch-path multiple-fiber 211 including a plurality of optical fibers 212, in place of the straight-path optical fibers 104 and 105 and the branch-path optical fibers 114 and 115 shown in FIG. 9, but has the same structure for the other part as that of FIG. 9. That is, elements 201, 202, 207 and 208 correspond to the elements 101; 108 and 118; 111; and 107 and 117 of FIG. 9, respectively. The element 202 is constituted by a wavelength selective film which passes an optical signal with wavelength λ1 and reflects an optical signal with wavelength λ2, as per the wavelength selective films 108 and 118 of FIG. 9. The bottom and top substrates 201 and 207 have guide grooves formed on their surfaces, which correspond to the guide grooves 102, 103, 112 and 113 of FIG. 9. Reference numerals 210a and 212a denote bare optical fiber portions. Reference numeral 203 in FIG. 20 is a pin corresponding to the alignment pin 130 of FIG. 15, and the pin 203 is fitted in alignment-pin guide grooves (not shown) formed in the substrates 201 and 207.

As the operation of the wavelength division multiplexer/demultiplexer according to this embodiment is the same as the operation of the one shown in FIG. 9, its explanation will be omitted.

Figure 21:
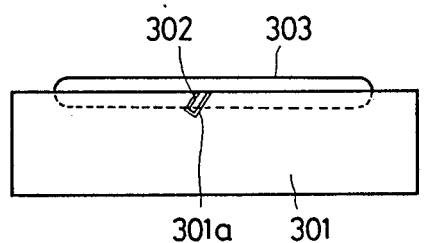
FIGS. 21 and 23 are side views of a straight-path section and a branch-path section of an optical component according to a fifth embodiment of this invention, respectively.
Figure 23:
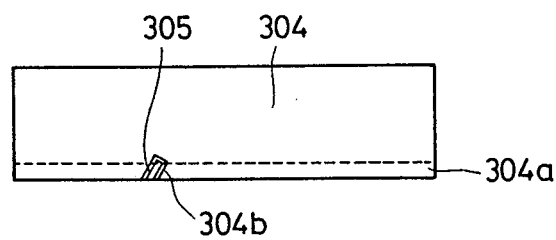

FIGS. 21 and 23 respectively illustrate a straight-path section and a branch-path section of a wavelength division multiplexer/demultiplexer according to the fifth embodiment of the present invention. This device is basically constructed in the same manner as the device according to the second embodiment shown in the device according to the second embodiment shown in FIG. 9. The difference lies in that the top and bottom substrates are secured by adhesives in the second embodiment whereas in the fifth embodiment, they are separately constituted and are provided to be usable in combination in accordance with the function of the optical system or the operating wavelength. In FIGS. 21 and 23, elements 301, 301a, 302, 304, 304b, and 305 respectively correspond to the elements 101, 107, 108, 111, 117 and 118 in FIG. 9. The elements 302 and 305 are respectively constituted by a wavelength selective film for passing an optical signal with wavelength λ1 and reflecting an optical signal with wavelength λ2 and a wavelength selective film for reflecting an optical signal with wavelength λ3. Alignment pins 303 are fitted and secured in alignment-pin guide grooves (not shown) with, for example, a V cross section, formed in the surface of the bottom substrate 301, and these pins 303 are adapted to be fitted in similar guide grooves 304 formed in the surface of the top substrate 304.

Incidentally, the alignment pins 303 may be mounted in advance on the top substrate 304, or may be mounted on either one of the top and bottom substrates 301 and 304 when these substrates are secured to each other.

Figure 22:
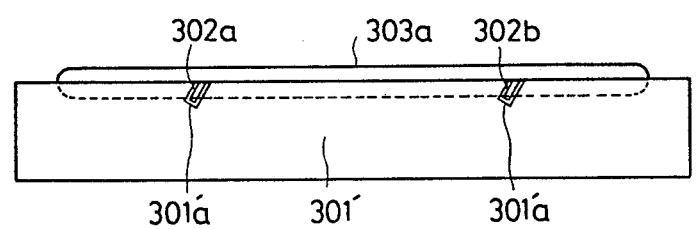
FIGS. 22 and 24 are side views illustrating modifications of the optical component as shown in FIGS. 21 and 23.

FIG. 22 illustrates a modification of the straight-path section of FIG. 21 in which two slits 301'a of the bottom substrate 301' are respectively formed with a wavelength selective film 302a for passing an optical signal with wavelengths λ1 and λ3 and reflecting an optical signal with wavelength λ2 and a wavelength selective film 302b for passing an optical signal with wavelength λ1 and reflecting an optical signal with wavelength λ3. Reference numeral 303a is an alignment pin.

Figure 24:
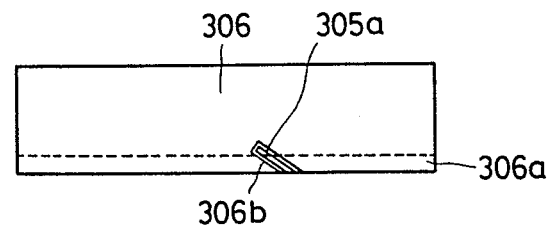

FIG. 24 illustrates a modification of the branch-path section of FIG. 23 in which a slit 306b is formed in the surface of the top substrate 306 at a predetermined angle different from that of the slit 304b of FIG. 23, alignment-pin guide grooves 306a similar to the grooves 304a are formed in the surface of the substrate 306, and a total reflection film 305a, for example, is fitted and secured in the slit 306b.

Figure 25:
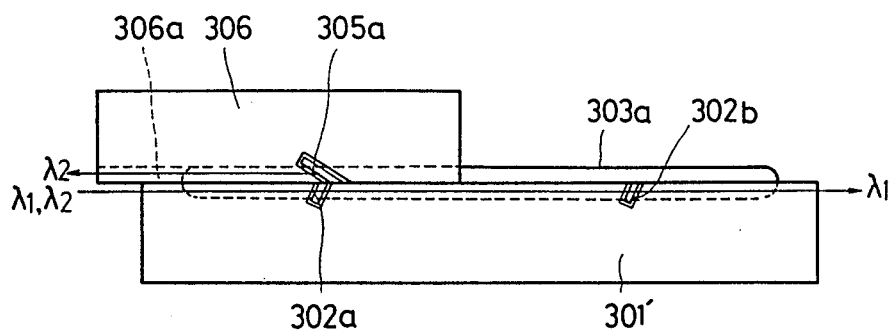
FIGS. 25 through 27 are diagrams for explaining the operation of the optical component of this invention.
Figure 26:
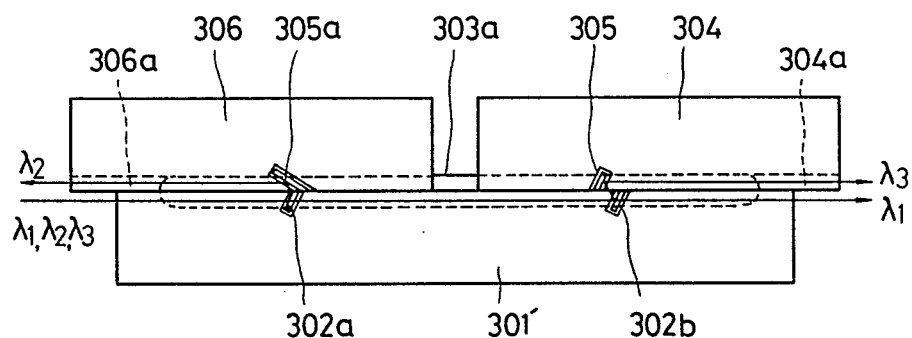
Figure 27:
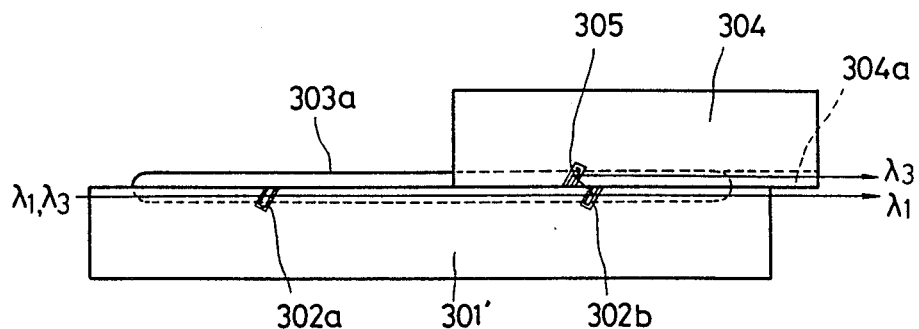

The operation of the above optical component will be explained referring to FIGS. 25–27. As shown in FIG. 25, the straight-path section of FIG. 22 is prepared first and the branch-path section is disposed on the straight-path section. With the alignment pins 303a fitted in alignment-pin guide grooves 306a, the branch-path section is slid in the lengthwise direction with respect to the straight-path section for optical axial alignment and the branch-path section is temporarily secured to the straight-path section. When an optical signal with wavelengths λ1 and λ2 enters the optical fibers from the left side of the bottom substrate 301', the optical signal with wavelength λ2 is reflected at the wavelength selective film 302a and the total reflection film 305a and returns to the left side. The optical signal with wavelength λ1, however, passes through the wavelength selective films 302a and 302b to the right side of the substrate 301'. The combination as shown in FIG. 25 serves as a two-wavelength division demultiplexer for wavelengths λ1 and λ2, and for an optical signal coming from the opposite direction, the same combination serves as a two-wavelength division multiplexer. As shown in FIG. 27, if the branch-path section of FIG. 23 is similarly temporarily secured to the straight-path section of FIG. 22 and an optical signal with wavelengths λ1 and λ3 enters from the left side, the combination serves as a two-wavelength division demultiplexer for wavelengths λ1 and λ3, and for the optical signal entering from the opposite direction, the same combination serves as two-wavelength division multiplexer for wavelengths λ1 and λ3. Further, if the branch-path sections shown in FIGS. 23 and 24 are simultaneously temporarily secured to the straight-path section and an optical signal enters as illustrated in FIG. 26, the combination serves as a three-wavelength division demultiplexer for wavelengths λ1, λ2 and λ3, and for the optical signal entering from the opposite direction, the combination serves as a three-wavelength multiplexer. By changing the branch-path section in the above manner, the optical component can cope with an alternation in the operating wavelength.

It is possible that the wavelength division multiplexer/demultiplexer of FIG. 25 or FIG. 27 is prepared for the time being and is expanded as shown in FIG. 26 later. If the multiplexing function is not necessary for the time being but may be needed later, a low cost optical component can be prepared for the present and be added with the multiplexing function later as desired. The cost for the optical component can be further decreased by adapting such a design that a single top substrate section can be slid with respect to a plurality of bottom substrate sections using alignment-pin guide grooves.

Figure 28:
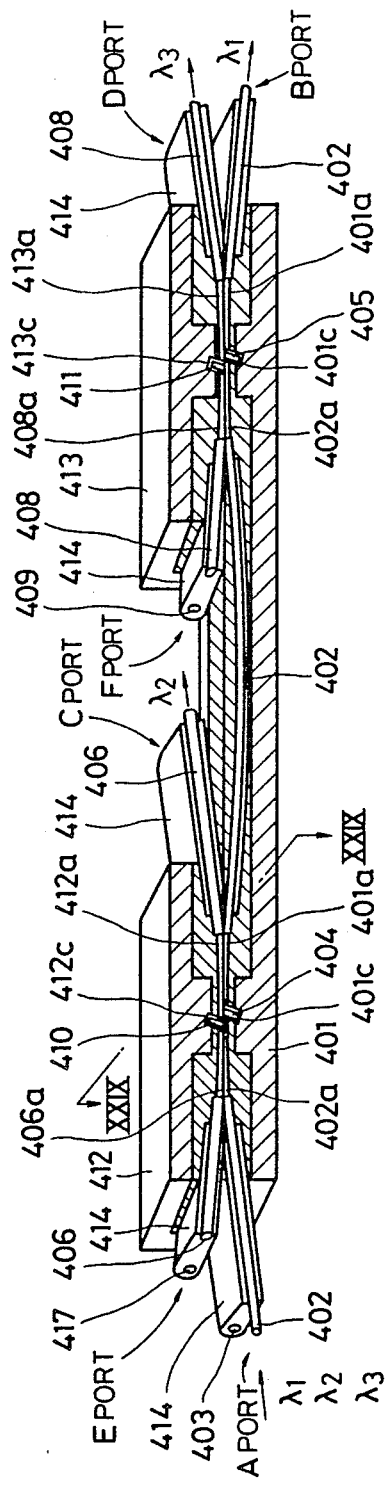
FIG. 28 is a partially cross-sectional perspective view of a three-wavelength two-fiber type of wavelength division multiplexer/demultiplexer according to a sixth embodiment of this invention.
Figure 29:
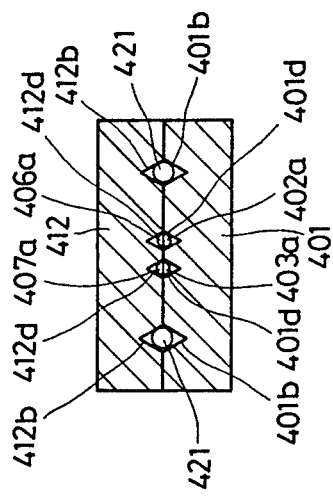
FIG. 29 is a cross section as taken along the line XXIX—XXIX in FIG. 28.

FIGS. 28 and 29 illustrate a three-wavelength two-fiber wavelength division multiplexer/demultiplexer according to a sixth embodiment of this invention, which is intended to provide multiplexing/demultiplexing of a three-wavelength optical signal with the use of a low-cost single unit that does not require large space for its provision.

The wavelength division multiplexer/demultiplexer according to this embodiment has one straight-path section and two branch-path sections, which are basically constituted in the same manner as those shown in FIGS. 9 and 10. That is, elements 401; 401d; 402 and 403; and 401c in FIGS. 28 and 29 respectively correspond to the elements 101; 102 and 103; 104 and 105; and 107 in FIG. 9. Elements 412 and 413; 412d; 406 and 407; and 412c in FIGS. 28 and 29 respectively correspond to the elements 111; 112 and 113; 114 and 115; and 117 in FIG. 9. Reference numerals 402a, 403a and 406a–409a denote bare optical fiber portions of optical fibers 402, 403 and 406 to 409.

Elements 421; and 401b and 412b in FIG. 29 respectively correspond to the elements 130; and 109, 109', 119 and 119' in FIG. 15. Reference numerals 404 and 405; and 410 and 411 are wavelength selective films corresponding to the wavelength selective films 108 and 118 in FIG. 9. The films 404 and 410 are subjected to optical axial alignment in such a manner that an optical signal reflected at either one enters the other, and the films 405 and 411 are similarly subjected to the optical axial alignment. The films 404 and 410 pass an optical signal with wavelengths λ1 and λ3 while reflecting an optical signal with wavelength λ2, and the films 405 and 411 pass an optical signal with wavelength λ1 while reflecting an optical signal with wavelength λ3.

The wavelength division multiplexer/demultiplexer according to this embodiment is basically constituted in the same manner as the one according to the second embodiment (FIG. 9). First, the straight-path substrate 401, the individual branch-path substrates 412 and 413, and the peripheral elements are prepared in accordance with the procedures described with reference to the second embodiment. Then, the branch-path substrate 412 is tightly jointed on the straight-path substrate 401, under the condition in which optical signals coming through A ports of the optical fibers 402 and 403 of the substrate 401 are respectively reflected at the wavelength selective films 404 and 410 and are then propagated through C ports of the optical fibers 406 and 407 of the substrate 412. Similarly, the branch-path substrate 413 is tightly jointed on the straight-path substrate 401, thereby providing D and B ports.

Referring now to FIG. 28, the operation of the above wavelength division multiplexer/demultiplexer will be explained.

When an optical signal with wavelengths λ1, λ2 and λ3 enters through the A ports of the optical fibers 402 and 403, the wavelength selective films 404 and 405 pass the optical signal with wavelength λ1, so that this optical signal is propagated through the B ports of the optical fibers 402 and 403. The optical signal with wavelength λ2 is reflected at the wavelength selective films 404 and 410 and is propagated through the C ports of the optical fibers 406 and 407, while the optical signal with wavelength λ3 penetrates the wavelength selective film 404, is reflected at the films 405 and 411 and is propagated through the D ports of the optical fibers 408 and 409. In this manner, the three-wavelength division demultiplexing process is executed. On the other hand, if an optical signal with wavelength λ1 enters through the B ports of the optical fibers 402 and 403, an optical signal with wavelength λ2 enters through the C ports of the optical fibers 406 and 407 and an optical signal with wavelength λ3 enters through the D ports of the optical fibers 408 and 409, then an optical signal with wavelengths λ1, λ2 and λ3 is propagated through the A ports of the optical fibers 402 and 403, whereby a three-wavelength division multiplexing process is executed. In this case, E and F ports in FIG. 28 are unused.

Figure 30:
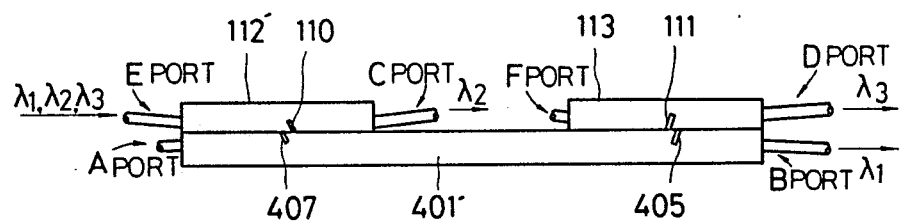
FIGS. 30 and 31 are side views illustrating modifications of the wavelength division multiplexer/demultiplexer of FIG. 28.
Figure 31:
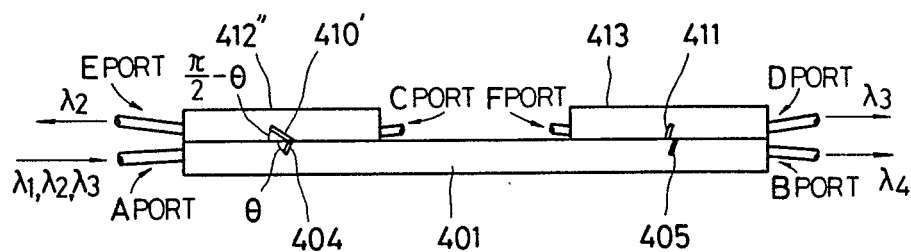
Figure 32:
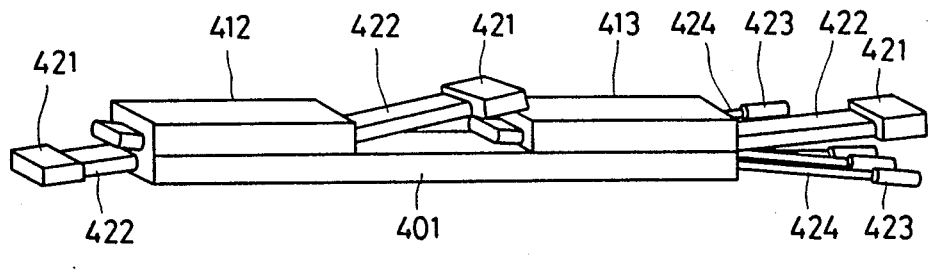
FIG. 32 is a perspective view illustrating another modification.

In a modification shown in FIG. 30, the wavelength selective film 404 of the straight-path common substrate 401' and the wavelength selective film 410 of the branch-path substrate 412' are arranged at the opposite predetermined angle to the one involved in FIG. 28, so that the E ports of the substrate 412' is constituted as an input port for an optical signal with wavelengths λ1, λ2 and λ3. The A and F ports are unused. According to another modification shown in FIG. 31, a total reflection film 401' is used in the branch-path substrate 412'. The wavelength selective film 410' is provided at an inclined angle of $(\pi/2) - \theta$, as shown in FIG. 31, with the inclined angle of the wavelength selective film 404 being $\theta$ (rad). As shown in FIG. 32, the input/output termination can be constituted by a multiple-fiber ferrule 421 or a single-fiber ferrule 423 in place of the optical fiber. Reference numerals 422 and 424 are a ribbon fiber and a single fiber, respectively.

Although the above explanation has been given with reference to a two-fiber wavelength division multiplexer/demultiplexer, this invention is not limited to the two-fiber type but can be applied to other type of a multiple-fiber wavelength division multiplexer/demultiplexer as well as to the optical processing of an optical signal with three or more wavelengths. The optical fibers may be a plurality of single fibers or a ribbon fiber.

Figure 33:
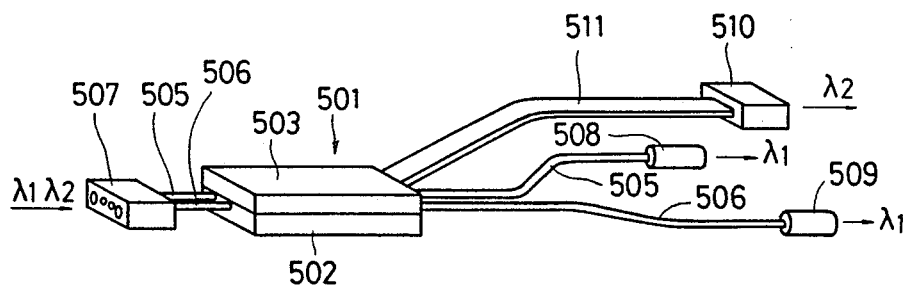
FIGS. 33 and 34 are perspective views respectively illustrating the internal structure and a case of a two-fiber optical component according to a seventh embodiment of this invention.
Figure 34:
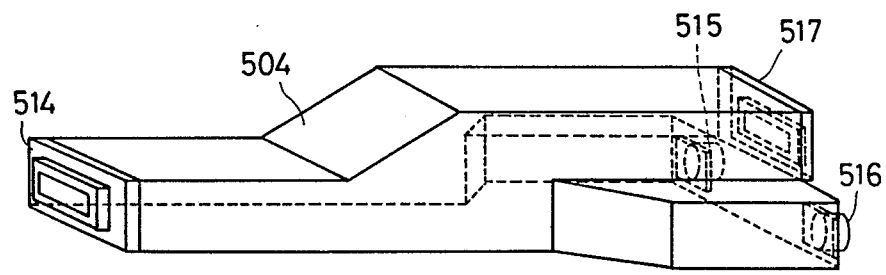
Figure 35:
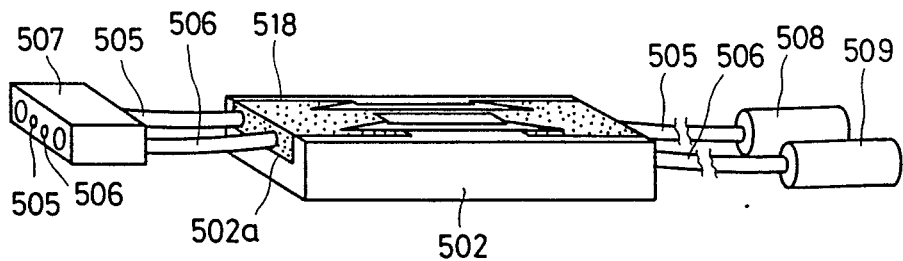
FIG. 35 is a perspective view illustrating a straight-path section of FIG. 33.
Figure 36:
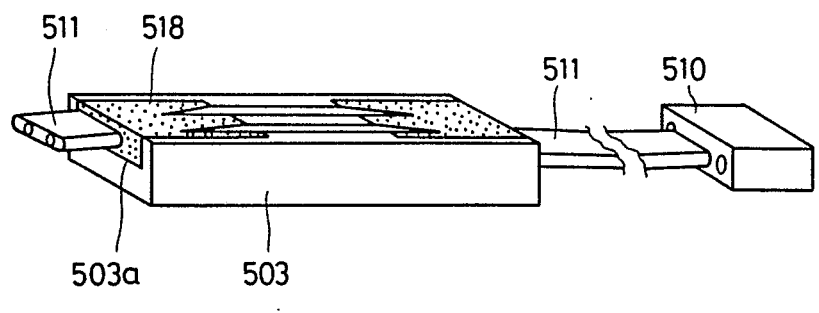
FIG. 36 is a perspective view illustrating a branch-path section.
Figure 37:
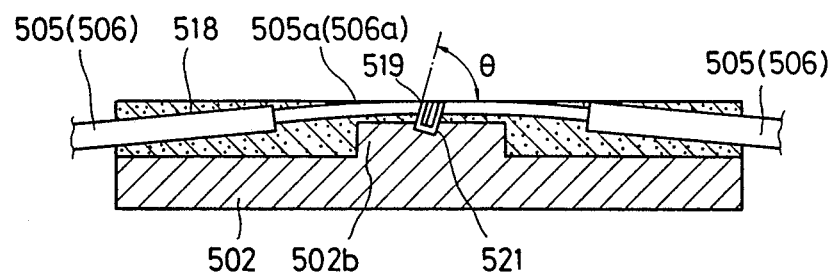
FIG. 37 is a longitudinal cross section of a straight-path substrate.
Figure 38:
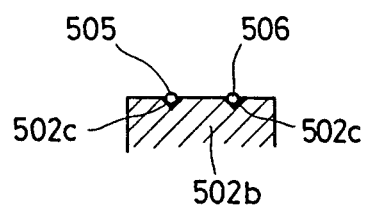
FIG. 38 is an enlarged transversal cross section of a center portion of a straight-path substrate in its lengthwise direction.

FIG. 33 and 34 illustrate a two-fiber optical component according to the seventh embodiment of this invention. This optical component has a two-fiber wavelength division multiplexer/demultiplexer 501, as the main body, which has a function of executing a two-fiber input/single-fiber output conversion and has substantially the same arrangement as the one shown in FIG. 9. Each of single fibers 505 and 506 for the straight-path of the element 501 has its one end coupled to a two-fiber ferrule 507 as an input port and the other end coupled to single-fiber ferrules 508 and 509 as output ports. A two-fiber ribbon 511 for the branch-path of the element 501 has its one end coupled to a two-fiber ferrule 510 serving as an output port.

Further, the optical component includes a case 504 in which a two-fiber connector adapter or receptacle 514 is mounted on one end wall of the case and a similar adapter 517 and for a single-fiber connector adapters 515, 516 are mounted on the upper and lower portions of the other end wall of the case, respectively. The aforementioned elements 501 and 505–511 are accommodated in the case 504. Each of the individual adapters 514–517 is coupled to an associated one of the elements 507–511 and adapted for connection with an external two-fiber connector or an external single-fiber connector.

The component may be arranged to supply a pigtail output instead of the receptacle or connector output. The two-core fiber ribbon 511 and the single fibers 505 and 506 should be cut to have the proper lengths in accordance with the shape and size of their case 504. The two-fiber ferrules 507 and 510 may be ferrules of a type having a pair of alignment-pin holes formed outside the fibers, for instance.

As the optical component according to this embodiment may be constituted in substantially the same manner as the one shown in FIG. 9, a detailed description of the manufacturing method will be omitted. The difference, however, lies in that wide grooves 502a; 503a, instead of the alignment grooves 102, 103; 112, 113 of FIG. 9, are formed in both substrates 502 and 503, and optical fiber guide grooves are formed at projecting portions provided at the center portions of the substrates in their lengthwise direction as shown in FIGS. 35–38 (only the projecting portion and groove of the substrate 502 being denoted by reference numerals 502b and 502c). In the figure, reference numerals 505a and 506a are fiber cores, 518 is an optical adhesive, 519 is a wavelength selective film and 521 is a slit.

With the above arrangement, if an optical signal with wavelengths λ1 and λ2 enters simultaneously to the single fibers 505 and 506 from the two-fiber ferrule 507, the optical signal with wavelength λ1 passes through the wavelength selective film 519 and is propagated trough the single-fiber ferrules 508 and 509 while the optical signal with wavelength λ2 is successively reflected at the wavelength selective film 519 and the film of the branch-path substrate 503 and is propagated through the two-fiber ferrule 510.

Figure 39:
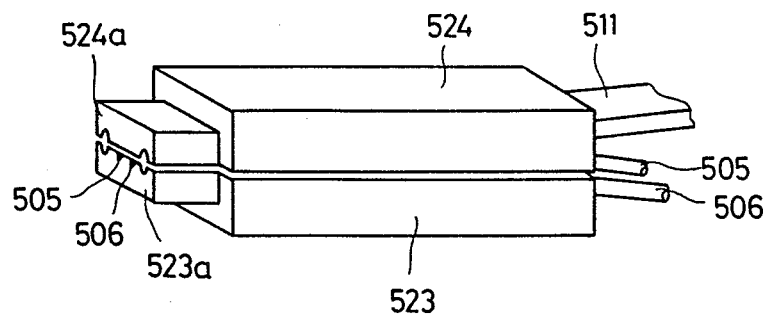
FIG. 39 is a perspective view illustrating a modification of an input/output port of the multiple-fiber optical component of FIG. 33.
Figure 40:
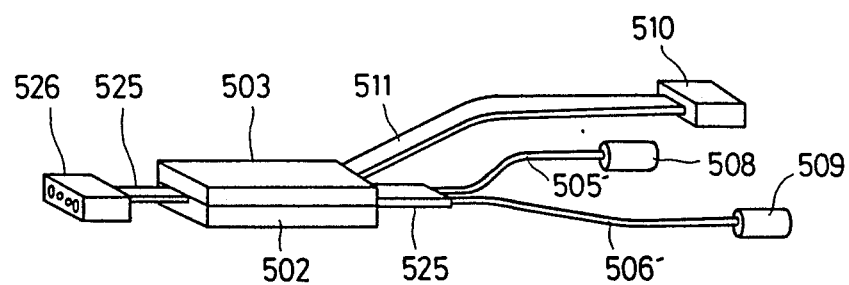
FIG. 40 is a perspective view illustrating a modification of the internal structure of the multiple-fiber optical component.
Figure 41:
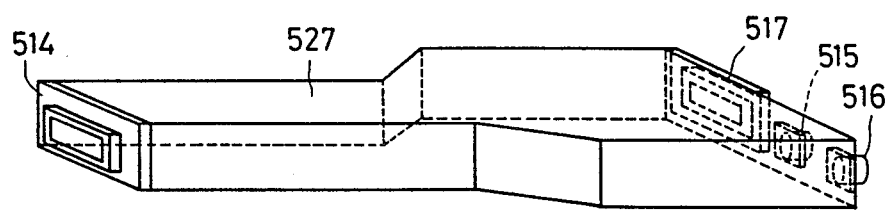
FIG. 41 is a perspective view illustrating a modification of the case suitable for the structure of FIG. 40.

The multiple-fiber optical component is not limited to a wavelength division multiplexer/demultiplexer but may be an optical coupler/splitter or the like. If a splitting film for splitting an optical signal with a predetermined wavelength by a given splitting ratio is used instead of the wavelength selective film 519 and a total reflection film is substituted for the wavelength selective film of the substrate 503, the optical component serves as the optical coupler/splitter. The input/output port of the two-fiber wavelength division multiplexer/demultiplexer 501 is not limited to the type which has the two-fiber type fiber ribbon whose terminations are coupled to the two-fiber ferrule; it may be constituted to be a two-fiber ferrule, as shown in FIG. 39, such that respective one end faces 523a and 524a of the straight-path substrate 523 and the branch-path substrate 524a can be adapted for connection with a two-fiber ferrule so that at least one port of this two-fiber wavelength division multiplexer/demultiplexer is coupled directly to the main body of the same. Further, as shown in FIG. 40, two single fibers 505 and 506 may replace a two-fiber type fiber ribbon 525 having a two-fiber ferrule 526 at its one termination, and the other termination of the ribbon 525 may be separated to provide single fibers 505' and 506'. In this case, as shown in FIG. 41, a case 27 is used, which has a a two-fiber connector adapter 517 and two single-fiber connector adapters 15,16 which are juxtaposed to the adapter 517.

Figure 42:
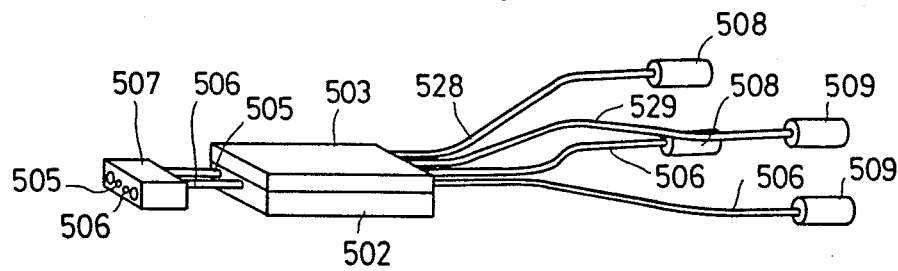
FIG. 42 is a perspective view illustrating the internal structure of an optical component according to a modification of the seventh embodiment.
Figure 43:
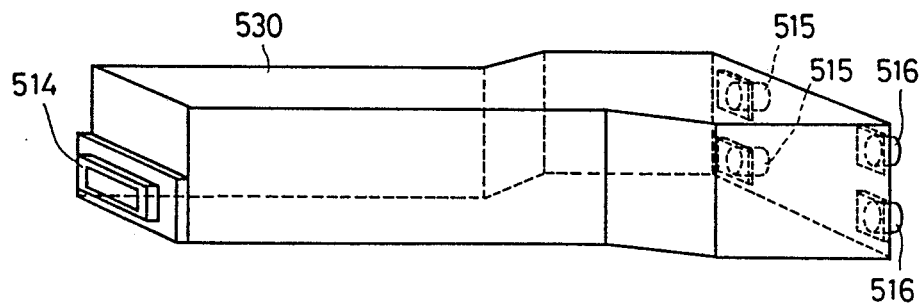
FIG. 43 is a perspective view of a case of the same optical component.

According to a modification of the seventh embodiment shown in FIG. 42, the two-fiber wavelength division multiplexer/demultiplexer has, in place of the two-fiber ribbon 511 and the two-fiber ferrule 510 shown in FIG. 33, single fibers 528 and 529 and further, single-fiber ferrules 508 and 509 coupled to respective one terminations of the fibers 528 and 529, so as to provide a two-fiber/single-fiber conversion output from two ports. In this regard, a case 530 shown in FIG. 43 also has two pairs of single-fiber connector adapters 515 and 516. The ports for providing a two-fiber/single-fiber conversion output is not limited in number to two but a predetermined number of ports can be provided in accordance with the demultiplexing characteristic of a wavelength division multiplexer/demultiplexer. In addition, the number of input/output ports is not limited to three as shown in FIG. 33.

Figure 44:
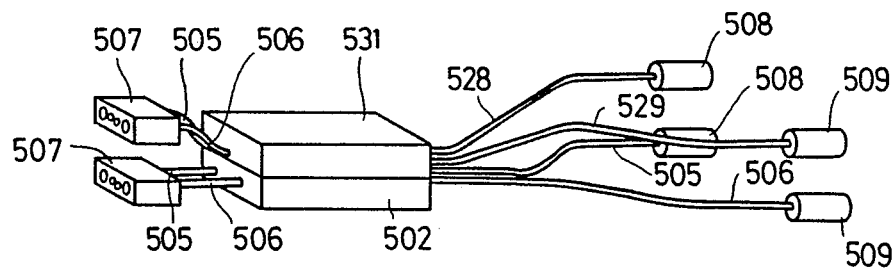
FIG. 44 is a perspective view illustrating the internal structure of an optical component according to another modification.
Figure 45:
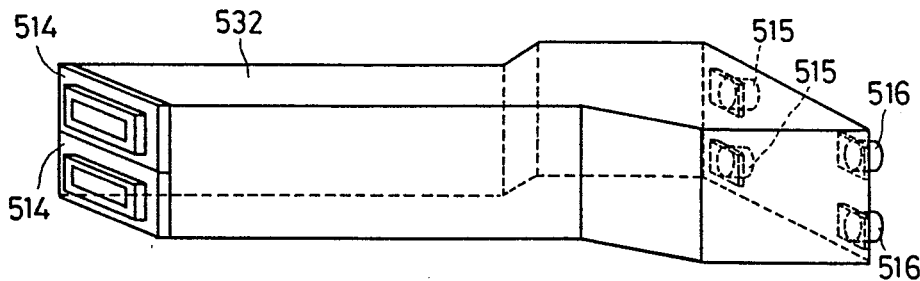
FIG. 45 is a perspective view of a case of the same optical component.

In another modification of FIG. 44, the two-fiber wavelength division multiplexer/demultiplexer has two two-fiber ferrules 507 and 507 and two pairs of single-fiber ferrules 508 and 509, thus constituting four ports. As shown in FIG. 45, two-fiber connector adapters 514, 514 for the associated two ports and single-fiber connector adapters 515 and 516 for the remaining two ports are mounted to a case 532, in order for the case to be applicable to this wavelength division multiplexer/demultiplexer.

Figure 46:
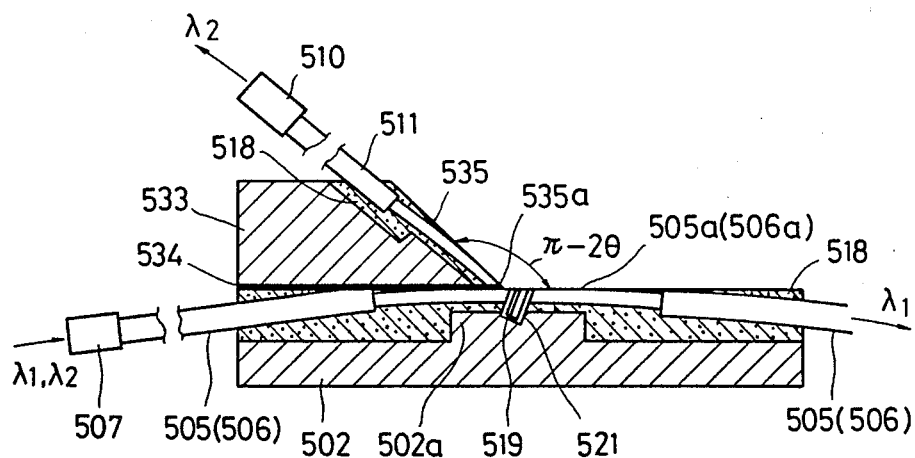
FIG. 46 is a longitudinal cross section of a further modification of the seventh embodiment.

FIG. 46 illustrates a further modification, which is constituted in substantially the same manner as the one shown in FIG. 17. Each of unsheathed portions of a two-fiber ribbon 511 is disposed in an associated one of optical fiber guide grooves of a branch-path substrate 533 and is secured there by optical adhesives 518. Then, the branch-path substrate 533 is cut and polished together with a two-fiber ribbon 511 with an angle of 2 θ(rad) with respect to a polished face 535 of the branch-path substrate 533, i.e., such an angle that the polished face 535 forms an angle of π− 2 θ(rad) with respect to the lengthwise direction of the single fibers 505 and 506 of the straight-path substrate 502. The cut face of the branch-path substrate 533 is brought into closed contact with and secured to the polished face of the straight-path substrate 502. In securing these faces, optical axial alignment is performed as described with reference to FIG. 17. A wavelength selective films 534 is disposed between the polished faces of the substrates 502 and 533.

Although the above description has been given with reference to a two-fiber wavelength division multiplexer/demultiplexer as a multiple-fiber optical component, this invention can also be applied to other types of multiple-fiber optical components such as an optical coupler/splitter. This invention is also not limited to a two-fiber type and can be applied to N-fiber optical components (N=2, 3, 4, ...) as well. An N-fiber input/output port of an N-fiber optical component can be constituted by any one of an N-fiber ribbon, an N-fiber ferrule or an N-fiber ribbon whose terminations are connected to an N-fiber ferrule.

Figure 47:
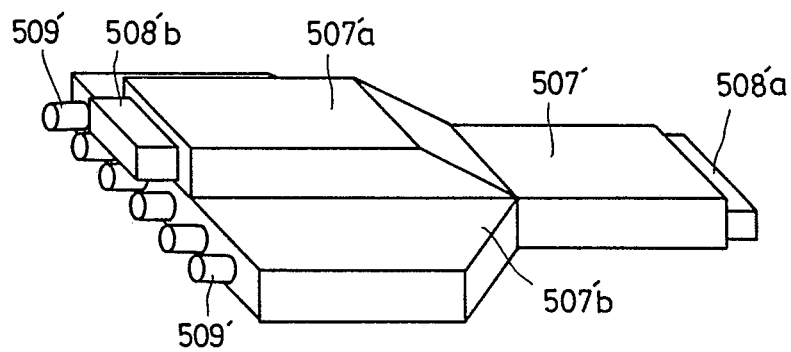
FIG. 47 is a perspective view of an optical component according a still further modification.
Figure 48:
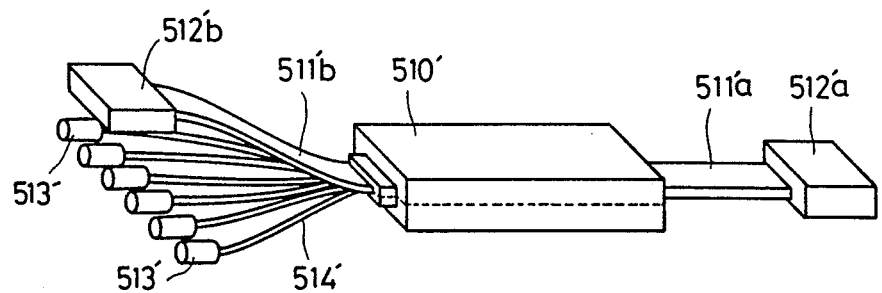
FIG. 48 is a perspective view illustrating the internal structure of the same optical component.
Figure 49:
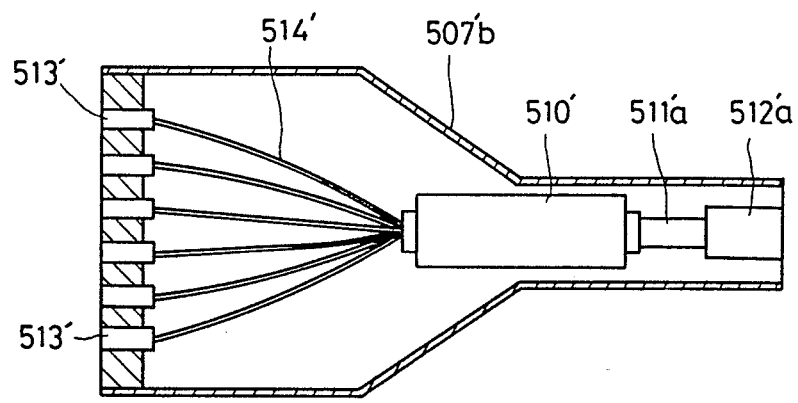
FIG. 49 is a horizontal cross section of the same optical component.

FIGS. 47 through 49 illustrate a multiple-fiber optical component according to a further modification of the seventh embodiment shown in FIG. 33, which incorporates a multiple-fiber wavelength division multiplexer/demultiplexer as an optical component main body having three input/output ports. A case 507', having mounting sections on which input/output port connector adapters are mounted, is mounted with a multiple-fiber connector adapter 408'a at its upper case portion 507'a located at one of the mounting sections, and has a lower case portion 507'b mounted with a plurality of a single-fiber connector adapters 509'. The other input/output port adapter mounting section is mounted with a multiple-fiber connector adapter 508'a. Each of these adapter or receptacle is adapted for direct connection with an external multiple-fiber connector or an external single-fiber connector.

In FIGS. 48 and 49, reference numeral 501' is a multiple-fiber wavelength division multiplexer/demultiplexer, 511'a and 511'b are multiple-fiber ribbons, 512'a and 512'b are multiple-fiber connector ferrules, 513' is a single-fiber connector ferrule and 514' is a single fiber. The structure and operation of the optical component of this modification are substantially the same as the previously-mentioned optical component, so that their description will be omitted here.

Figure 50:
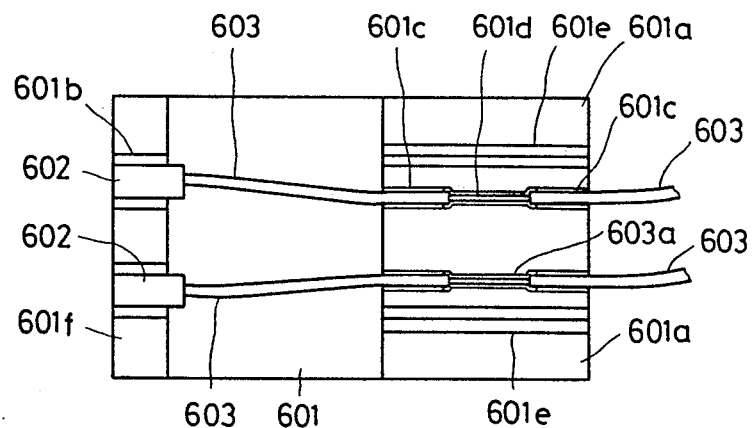
FIG. 50 is a plan view illustrating a common substrate of an optical component according to an eighth embodiment of this invention.
Figure 51:
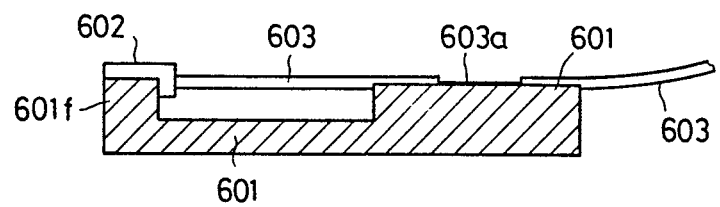
FIG. 51 is a cross section of the same substrate.
Figure 52:
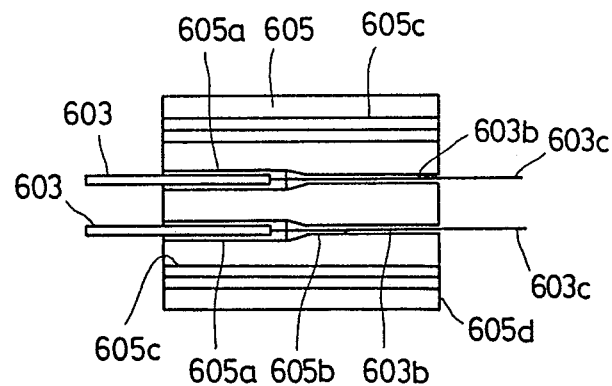
FIG. 52 is a plan view illustrating another substrate constituting, together with the common substrate, the same optical component.

Referring now to FIGS. 50 through 52, an optical component according to an eighth embodiment to which the manufacturing method of this invention is applied, will be explained.

Figure 54:
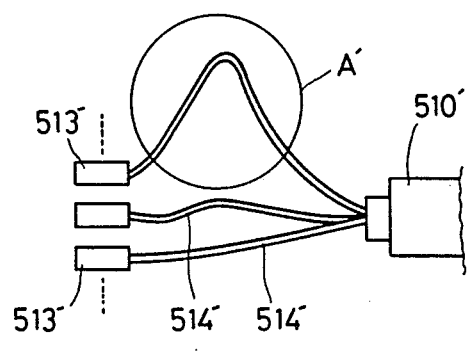
FIG. 54 is a diagram illustrating a bending state of an optical fiber caused at the time of assembling the optical component of FIG. 49.

This method is intended to prevent occurrence of defects and the like at the time of manufacturing the one shown in FIGS. 47-49. In manufacturing the optical component shown in FIGS. 47-49, since a plurality of single-fiber connector ferrules 513' and the multiple-fiber connector ferrule 512' are respectively secured to both ends of the case 507', the single fibers 514' and the multiple-fiber ribbon 511'a should have their lengths properly controlled. Particularly, with the single fibers having different lengths than predetermined lengths, they need to have their slacks bent as shown by symbol A' in FIG. 54 to be accommodated in the case 507' (FIG. 47). This increases defects and deteriorates the reliability. To prevent this problem, it is necessary to provide length adjustment of the order of 1 mm with respect to a length of several centimeters, and such adjustment is not easy and is a main cause for reduction in yield of multiple-fiber optical component.

The optical component shown in FIGS. 50-52 includes a two-fiber wavelength division multiplexer/demultiplexer. In manufacturing this multiplexer/demultiplexer, first, a common substrate 601 is prepared which has a lower substrate portion 601a and a single-fiber connector ferrule holding portion 601f for holding a group of input/output single-fiber connectors. Optical-fiber guide grooves 601c, bare-fiber portion guide grooves 601d and alignment-pin guide grooves 601e, each with a V-shaped cross section, are formed in advance in the surface of the lower substrate portion 601a. Single-fiber connector guide grooves 601b with a V-shaped cross section are also formed in advance in the surface of the single-fiber connector ferrule holding section 601f. Similarly, optical-fiber guide grooves 605b, bare-fiber portion guide grooves 605b and alignment-pin guide grooves 605c, each with a V-shaped cross section, are formed in the surface of a two-fiber connector lower substrate 605 (FIG. 52) which constitutes input/output multiple-fiber connector of the optical component. Then, the mutual position of the common substrate 601 and the lower substrate 605 is fixed.

Then, single-fiber connector ferrules 602 each fixedly connected with one end of an associated optical fiber 603 are fitted and secured in the grooves 601b, and bare fiber portions obtained by eliminating the coating of the optical fibers 603 are disposed on the lower substrate portion 601a and secured there by means of optical adhesives. The bare fiber portions 603a are each formed in a predetermined lengthened region of the associated optical fiber, which region is set in accordance with the distance between the associated bare-fiber portion guide groove 601d and single-fiber connector guide groove 601b so as not to bend the optical fiber 603. Then, a slit (not shown) is formed in the surface of the lower substrate portion 601a, and after a wavelength selective film (not shown) is secured in the slit by means of optical adhesives, the surface of the lower substrate portion 601a is polished. A similarly-prepared upper substrate portion (not shown) of the two-fiber wavelength division multiplexer/demultiplexer is put over the lower substrate portion 601a and adhered thereto, with their polished faces of the bare-fiber portions brought into closed contact. This completes the two-fiber wavelength division multiplexer/demultiplexer. At this time, the lengths of the free end portions of the optical fibers 603 are not adjusted yet.

In the next step, the sheathed portions and unsheathed or bare-fiber portions 603b of the optical fibers 603 are respectively fitted in the fiber guide grooves 605a and the bare-fiber portion guide grooves 605b of the lower substrate 605 while adjusting their lengths to avoid bending the optical fibers, and are then secured there by means of optical adhesives. The separately-prepared upper substrate (not shown) is put over and secured to the lower substrate 605, unnecessary portions of the bare-fiber portions 603c are cut off, and the end face 605d of the lower substrate 605, the end face of the upper substrate and end faces of the optical fibers are simultaneously optical-polished. The optical component is completed in the above manner, so that the optical fibers set in the component do not have slacks which otherwise be caused by variation in the lengths of the optical fibers, and the fibers are prevented from being bent to the extent that an optical transmission loss falling outside an allowable range takes place.

The lower substrate portion 601a of the main body of the two-fiber wavelength division multiplexer/demultiplexer and the lower substrate 605 for the two-fiber connector may be provided on the common substrate, while providing the single-fiber connector ferrule holding section on a separate substrate. In this case, the manufacturing process is performed from the substrate for the two-fiber connector.

Figure 53:
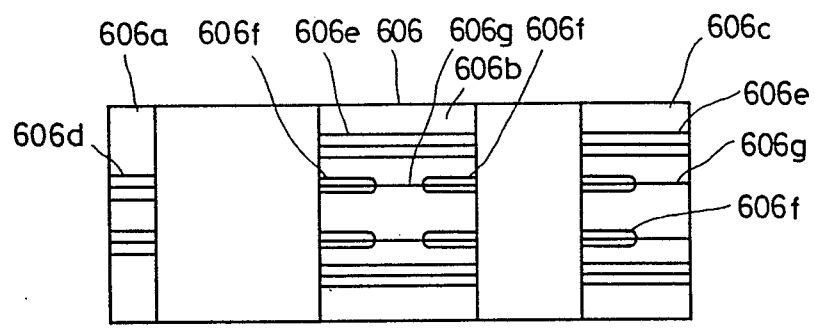
FIG. 53 is a plan view illustrating a common substrate for use in a modification of the optical component according to the eighth embodiment.

FIG. 53 illustrate a common substrate 606 for a two-fiber optical component according to a modification of the eighth embodiment to which the multi-fiber component manufacturing method of this invention is applied. On the common substrate 606 are formed, in a lump, a single-fiber connector ferrule holding section 606a formed with single-fiber connector guide grooves 606d, for holding input/output single-fiber connectors, a lower substrate portion 606b of the main body of a two-fiber wavelength division multiplexer/demultiplexer having optical fiber guide grooves 606f, bare-fiber portion guide grooves 606g and alignment-pin guide grooves 606e, and a lower substrate portion 606c for a two-fiber connector similarly formed with optical fiber guide grooves 606f, bare-fiber guide grooves 606g and alignment-pin guide grooves 606e, for constituting an input/output two-fiber connector. As the procedures for forming the common substrates are apparent from the foregoing description, their explanation will be omitted.

Although the above description has been given with reference to a two-fiber wavelength division multiplexer/demultiplexer as a multiple-fiber optical component, this invention can also be applied to other types of multiple-fiber optical components such as an optical coupler/splitter. This invention is also not limited to a two-fiber type and can be applied to N-fiber optical components (N=2, 3, 4, ...) as well. In the above embodiment, the connector is so designed that single-fiber connector ferrules and a multiple-fiber connector ferrule, respectively, are formed on opposite sides of the connector. However, multiple-fiber connector ferrules may be formed on both sides of the connector.

Figure 55:
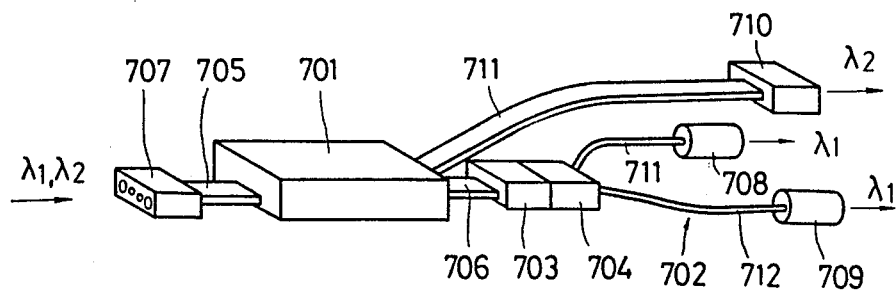
FIG. 55 is a perspective view illustrating the internal structure of an optical component according to a ninth embodiment of this invention.

FIG. 55 illustrates an optical component according to the ninth embodiment, which is comprised of the optical component of FIG. 33 and a two-fiber/single-fiber conversion component 702 accommodated therein. This optical component comprises elements 701 and 711 corresponding to the element 501 and 507—507 of FIG. 33, two-fiber ribbons 705 and 706 corresponding to single fibers 505 and 506 of FIG. 33, and the conversion component 702 coupled through a two-fiber ferrule 703 to an output port side end of the ribbon fiber 706. These elements are accommodated in the case shown in FIG. 34 or 41. The element 702 includes a two-fiber ferrule 704 coupled to the ferrule 703, and single fibers 711 and 712 which connect the ferrule 704 to single-fiber ferrules 708 and 709.

Figure 56:
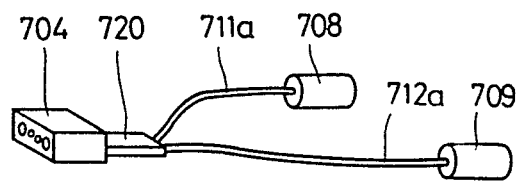
FIG. 56 is a perspective view of a modification of a two-fiber/single-fiber conversion component for use in the optical component of FIG. 55.

The single-fiber ferrules 708 and 709 should not necessarily be provided. Like the modification shown in FIG. 39, this optical component may be modified in such a way as to permit direct coupling of the input port side ferrule 707 to the wavelength division multiplexer/demultiplexer 701. Further, the single fibers 711 and 712 may be replaced with a two-fiber ribbon 720 whose one end located on the side of the single-fiber ferrules 708 and 709 is separated into two single fibers 711a and 712a, as shown in FIG. 56.

The operation of the optical component with the above structure will be explained below.

Assuming that optical signals with wavelengths λ1 and λ2 are incident through the two-fiber ferrule 707 to the individual fibers of the two-fiber wavelength division multiplexer/demultiplexer 701 as the main body of the optical component, the element 701 demultiplexes the two optical signals into an optical signal with wavelengths λ1 and λ2. The optical signal with wavelength λ1 reaches the two-fiber ferrule 704 through the two-fiber ribbon 706 and the two-fiber ferrule 703, undergoes two-fiber/single-fiber conversion there and comes out through the single-fiber ferrules 708 and 709. The optical signal with wavelength λ2 comes out from the two-fiber ferrule 710 through the two-fiber ribbon 711. In this manner, a two-fiber input can be converted into a single-fiber output by the optical component itself without using a multi-fiber optical connector specifically designed for multi-fiber/single-fiber conversion function.

Figure 57:
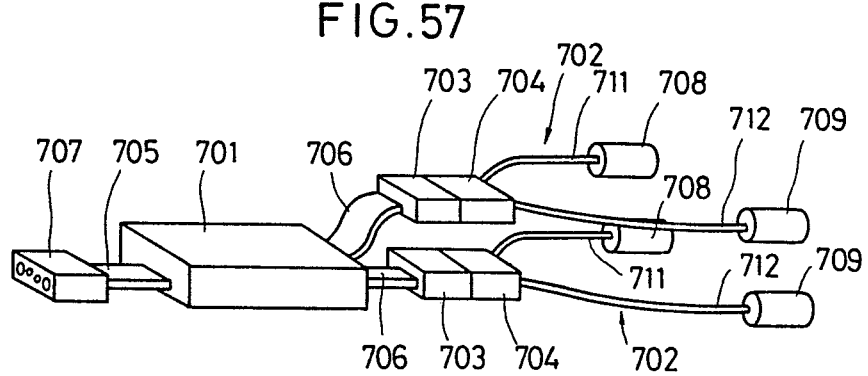
FIG. 57 is a perspective view of a modification of the optical component according to the ninth embodiment.

FIG. 57 illustrates a modification of the optical component of FIG. 55. In this modification, the two-fiber ribbon 711 and the two-fiber ferrule 710 in FIG. 55 are replaced with another two-fiber ribbon 706 and another two-fiber ferrule 703 a further two-fiber/single-fiber conversion component 702 is connected, whereby two conversion components are coupled to the wavelength division multiplexer/demultiplexer so as to provide two-fiber/single-fiber conversion outputs from two output ports. This modification uses the case shown in FIG. 43. The number of the ports for providing the two-fiber/single-fiber conversion outputs is not limited to two, but a different predetermined number of ports can be set in accordance with the demultiplexing characteristic and the like of the wavelength division multiplexer/demultiplexer 701.

Figure 58:
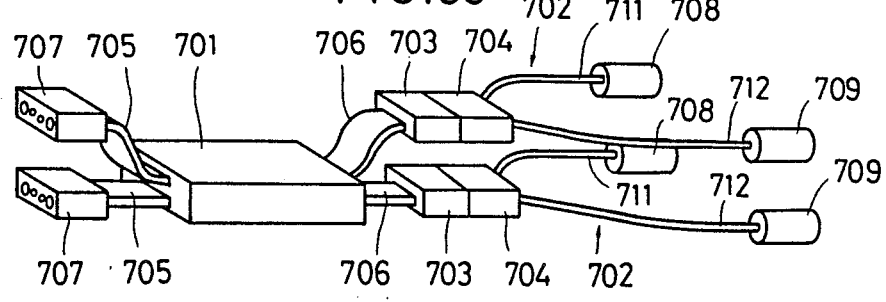
FIG. 58 is a perspective view of another modification.

FIG. 58 illustrates a further modification; the optical component is designed to be of a four-port type in which the two-fiber wavelength division multiplexer/demultiplexer 701 has two two-fiber ferrules 707 each constituting an input port, and two two-fiber ferrules 703 each constituting an output port and respectively coupled to single-fiber ferrules 708 and 709. This modification uses the case shown in FIG. 45.

Although the above description has been given with reference to a two-fiber wavelength division multiplexer/demultiplexer, this invention can also be applied to other types of multiple-fiber optical components such as an optical coupler/splitter. This invention is also not limited to a two-fiber type and can be applied to N-fiber optical components (N=2, 3, 4, ...) as well. In other words, according to this invention, an N-fiber/single-fiber conversion component can be coupled to at least one port side of an N-fiber optical component having two or more N-fiber input/output port sides. The N-fiber input/output ports of the N-fiber optical component can be constituted by any one of an N-fiber ribbon, an N-fiber ferrule or an N-fiber ribbon having one termination attached to an N-fiber ferrule. The N-fiber/single-fiber conversion component includes N single fibers each having one end coupled to an N-fiber ferrule and the other end coupled directly or through a single-fiber ferrule to an external unit.

This invention produce the following effects.

(1) Optical fibers constituting a branch path are arranged in parallel to those constituting a straight path and, in the processes for manufacturing the optical component, the individual optical fibers are secured to blocks having a plurality of guide grooves and these blocks are secured together. This can simplify optical axial alignment of the fibers and make a multiple-fiber optical component compact.

(2) The optical component of this invention is designed such that an optical signal incident from a straight-path optical fiber and then reflected at an optical film disposed across the fiber is propagated along the optical axis of a branch-path optical fiber. This can significantly reduce insertion loss in the branch section so that the optical component can be sufficiently adapted to recent wavelength division multiplexing systems.

(3) Slits are formed, with straight-path and branch-path optical fibers secured in respective guide grooves formed in their associated substrates, and optical films are secured in these slits in such a way that an optical signal incident to the straight-path fibers is propagated through the film along the optical axis of the branch-path fibers. This can ensure that substrates each having a plurality of optical fibers are cut together and are subjected to axial alignment, thus simplifying the manufacturing processes and reducing the manufacturing cost.

(4) Substrates having an optical film secured in a groove formed across optical fibers can be jointed together using alignment pins fitted in one of the substrates. This design makes it possible to realize a low cost optical component which is capable of performing multiplexing/demultiplexing function and of varying the operating wavelength as desired, thus increasing the flexibility in designing an optical system.

(5) A straight-path common substrate having a plurality of optical films with different characteristics provided across optical fibers is jointed with a plurality of branch-path substrates having optical films each having a characteristic suitable for an associated one of the straight-path optical films. With this design, a single multiple-fiber wavelength division multiplexer/demultiplexer can execute a wavelength division multiplexing/demultiplexing of optical signals with multi-wavelengths, thus providing a more compact and lower cost optical component as compared with a system using a plurality of multiple-fiber wavelength division multiplexers/demultiplexers.

(6) As single-fiber input/output means and multiple-fiber input/output means are provided at input/output ports of the straight body of a multiple-fiber optical component with a multiple-fiber/single-fiber conversion function, multiple-fiber optical components with a multiple-fiber/single-fiber conversion function, which have not been realized by the prior art, can easily be realized.

(7) As a multiple-fiber/single-fiber conversion component for executing a multiple-fiber/single-fiber conversion is coupled to at least one of multiple-fiber input/output ports of a multiple-fiber optical component, the optical component can directly execute a multiple-fiber/single-fiber conversion to provide a single-fiber output without using any multiple-fiber optical connector.

(8) After optical fibers are disposed and secured at an input/output connector section formed on a common substrate, free end portions of the optical fibers are disposed and secured without deformation to a lower substrate portion formed on the common substrate and then the lower substrate portion is subjected to the necessary processes. This can therefore prevent variation in length of each optical fiber of a multiple-fiber optical component and reduce defects due to such variation, thus improving the yield and eliminating the need for a troublesome adjustment of the fiber lengths. This can result in reduction in the manufacturing cost.

What is claimed is:

1. An optical component comprising:
   first, second and third blocks formed at their surfaces with first, second and third groups of guide grooves, respectively, said guide grooves of each group extending in parallel with each other, said first and second blocks being arranged to have respective one end faces facing each other, said third block being arranged to have the surface thereof on which the guide grooves are formed facing the surfaces of said first and second blocks on which the guide grooves are formed; and
   first to third groups of optical fibers being respectively placed and secured in said first through third groups of guide grooves, each of the optical fibers having an inclined face at one end, at least one of opposed optical fibers of said first and second groups of optical fibers being formed at the inclined face with a first optical film, each of said third group of optical fibers being formed at its inclined face with a second optical film;
   said opposed optical fibers of said first and second groups of optical fibers being jointed at said inclined faces to each other through an associated one of the first optical films in such a way that optical axes of said jointed optical fibers are aligned with each other;
   each of said third group of optical fibers being disposed so that its optical axis is aligned with optical axes of associated ones of said first and second groups of optical fibers and an optical signal incident to an associated one of said first group of optical fibers and then successively reflected at said first and second optical films is propagated along an optical axis of said each third group of optical fibers.

2. The optical component according to claim 1, wherein at least one alignment-pin guide groove is formed in the surface of each of said first to third blocks on which said first to third groups of optical fibers are respectively disposed, and said first to third blocks are held with a predetermined positional relationship by a common alignment pin disposed in said alignment-pin guide grooves.

3. The optical component according to claim 1, wherein each of the end faces of said first to third blocks obliquely extends and is disposed in flush with said inclined end faces of associated ones of said optical fibers.

4. The optical component according to claim 1, wherein said end faces of said first and second blocks are in contact with each other.

5. The optical component according to claim 1, wherein the surface of each of said first to third blocks, on which the guide grooves are formed, is located in flush with an outermost portion, from an associated one of the guide grooves, of an outer peripheral surface of each of said optical fibers secured in the guide grooves.

6. A method for manufacturing an optical component, comprising the steps of:
   forming a plurality of parallel fiber guide grooves and at least one alignment-pin guide groove in each of surfaces of at least first through third block members, to obtain at least first to third blocks;
   placing and securing optical fibers in said fiber guide grooves of said at least first to third blocks;
   obliquely polishing one end of each of said at least first to third blocks together with said optical fibers placed thereon to thereby form an inclined face;
   forming a first optical film on said inclined face of at least one of said first and second blocks and then arranging said first and second blocks in such a way that when an optical signal incident to a respective one of said optical fibers of said first block passes through said first optical film, said optical signal is propagated to a corresponding one of said optical fibers of said second block along an optical axis thereof;
   forming a second optical film on said inclined face of said third block and then arranging said third block in such a way that an optical axis of each optical fiber of said third block is in parallel to optical axes of associated ones of said optical fibers of said first and second blocks and when an optical signal incident to a respective one of said optical fibers of said first block is successively reflected at said first and second optical films, said optical signal is propagated to said each optical fiber of said third block along an optical axis thereof; and disposing a common alignment pin in said alignment-pin guide grooves respectively formed in said first to third blocks and bringing said first to third blocks into one piece by said common alignment pin.

7. The method according to claim 6, wherein in said inclined-face forming step, after a plurality of optical fibers are respectively disposed and secured in a plurality of parallel fiber guide grooves formed in a surface of a single continuous block member for said first and second block, said single continuous block member is obliquely cut together with said optical fibers into said first and second blocks.

8. A multiple-fiber optical component comprising:
a first substrate having a surface formed with a plurality of parallel guide grooves, and a slit crossing said guide grooves and extending from said surface to an opposite surface thereof at a predetermined angle;
an optical film fitted in said slit;
a group of straight-path optical fibers each placed, secured and halved into two sub-groups of optical fibers in an associated one of said guide grooves in such a way that the optical axes of each optical fiber sub-group, between which fiber sub-group said optical film is sandwiched, are aligned with each other;
a second substrate having a plurality of guide grooves formed on a surface thereof; and
a group of branch-path optical fibers, each placed and secured in a corresponding one of said guide grooves of said second substrate, each branch-path optical fiber being disposed in contact with a circumference of an associated one of said straight-path optical fibers in such a way that an optical signal incident to the associated one straight-path optical fiber and reflected at said optical film is propagated along an optical axis of said each branch-path optical fiber.

9. The optical component according to claim 8, wherein said second substrate has a surface formed with a plurality of parallel guide grooves and a slit extending across said guide grooves and from said surface to an opposite surface said second substrate at a predetermined angle, said optical component having an optical film being fitted in said slit, and branch-path optical fibers each being disposed and secured in an associated one of said grooves in such a way that optical axes of both halves of said each fiber, between which said optical film is sandwiched, are aligned with each other, and that an outer peripheral surface of said each fiber is in closed contact with an outer peripheral surface of an associated one of said straight-path optical fibers.

10. The optical component according to claim 8, wherein said second substrate has a surface formed with a plurality of guide grooves in which branch-path optical fibers are respectively disposed and secured, and each of the branch-path optical fibers has one end face obliquely polished and is disposed in closed contact at its end face with an outer peripheral surface of an associated one of said straight-path optical fibers.

11. The optical component according to claim 8, wherein said second substrate has a surface formed with a plurality of guide grooves in which branch-path optical fibers are respectively disposed and secured, and the branch-path optical fibers each have one end face, obliquely polished and formed thereover with an optical film, and an outer surface, disposed in closed contact with an outer surface of an associated one of said straight-path optical fibers.

12. The optical component according to any one of claims 8–11, wherein at least one of said first and second substrates is formed with at least one guide groove for receiving an alignment pin for optical axial alignment.

13. The optical component according to any one of claims 8–11, wherein at least one of said first and second substrates is formed with a guide groove for receiving an alignment pin adapted for connection with a multiple-fiber connector.

14. The optical component according to any one of claims 8–11, wherein said optical films formed in said first and second substrates are wavelength selective films.

15. The optical component according to any one of claims 8–11, wherein said optical film formed in said first substrate is a splitting film having a predetermined splitting ratio with respect to an optical signal with at least one wavelength, and said optical film formed in said second substrate is a total reflection film for effecting total reflection of an optical signal with said at least one wavelength.

16. A method for manufacturing a multiple-fiber optical component, comprising the steps of:
forming a plurality of parallel shallow guide grooves on a first plate at a substantially middle portion of a surface of the same substrate, to obtain a first substrate;
disposing and securing straight-path optical fibers in each of said guide grooves;
forming a slit crossing said straight-path optical fibers and extending from said surface of said first substrate to an opposite surface thereof at a predetermined angle;
fitting and securing an optical film in said slit;
disposing and securing branch-path optical fibers in a plurality of parallel guide grooves formed in a surface of a second substrate; and
disposing each of said branch-path optical fiber in contact with an outer surface of an associated one of said straight-path optical fibers in such a way that an optical signal incident to said associated one straight-path optical fiber and then reflected at said optical film is propagated along an optical axis of said each branch-path optical fiber.

17. The method according to claim 16, further comprising the step of polishing said surface of said first substrate in such a way that an outer surface of each of said straight-path optical fibers is polished up to a region short of a core of the same fiber, after disposing and securing said optical film in said slit of said first substrate.

18. The method according to claim 16, wherein said slit forming step includes the steps of:
arranging said first and second substrates in such a way that said guide grooves of said first substrate are respectively in parallel to said grooves of said second substrate; and
forming a slit on a surface of said second substrate together with the slit of said first substrate.

19. An optical component comprising:
a substrate;
at least one optical fiber disposed and secured on a surface of said substrate in a lengthwise direction thereof;

at least one optical film fittedly secured in at least one slit extending across said at least one optical fiber and from said surface of said substrate to an opposite surface thereof at a predetermined angle to said surface of said substrate, said film being adapted to be jointed to at least one external optical component; and at least one alignment pin for optical axial alignment, disposed on said surface of said substrate in said lengthwise direction of said surface thereof, said pin being adapted to be fitted to said at least one external optical component.

20. The optical component according to claim 19, wherein said at least one optical film includes a plurality of optical films having different characteristics from one another in association with plural external optical components.

21. The optical component according to claim 19, wherein said at least one optical fiber comprises an element selected from a group consisting of one single optical fiber, a multiple-fiber optical ribbon and a plurality of single fibers disposed in parallel in said lengthwise direction of said substrate.

22. A multiple-wavelength multiple-fiber type of wavelength division multiplexer/demultiplexer, comprising:

a straight-path common substrate;

a plurality of straight-path optical fibers, secured in a plurality of parallel optical fiber guide grooves provided in a surface of said straight-path common substrate in a lengthwise direction thereof;

a plurality of straight-path optical films with different characteristics secured respectively in a plurality of slits formed in said surface of said straight-path common substrate and extending across said straight-path optical fibers and from the same surface to an opposite surface thereof at predetermined angles to said surface thereof;

a plurality of branch-path substrates each having a plurality of parallel optical fiber guide grooves formed in a surface thereof in a lengthwise direction thereof;

a plurality of optical fibers secured in said optical fiber guide grooves of said branch-path substrates; and branch-path optical films with different characteristics from one another, said films being secured in slits respectively formed on said surfaces of said branch-path substrates, said slits of said branch-path substrates crossing said optical fibers of the same substrates and extending from said surfaces thereof to opposite surfaces thereof at angles, corresponding to the predetermined angles at which angles said slits of said straight-path common substrate extend, with respect to said surfaces of said branch-path substrates, said branch-path substrates being disposed in contact with and secured to said straight-path common substrate, with said branch-path optical films optically aligned respectively with said straight-path films of said straight-path common substrate in association with said characteristics of said branch-path films and said characteristics of said straight-path films.

23. A multiple-fiber optical component having a multiple-fiber/single-fiber conversion function to transmit optical signals between one of optical fibers of at least one multiple-fiber optical cable and at least one single fiber corresponding thereto, comprising:

a main body for executing said multiple-fiber/single-fiber conversion function, said main body having at least two input/output ports;

multiple-fiber input/output means provided at one of said input/output ports of said main body, through which said at least one multiple-fiber optical cable is optically connected to said one of the input/output ports; and single-fiber input/output means provided at the remaining at least one input/output port of said main body, through which said at least one single fiber is optically connected to said remaining at least one input/output port.

24. The optical component according to claim 23, wherein said main body comprises a multiple-fiber wavelength division multiplexer/demultiplexer having a straight-path section and a branch-path section, said straight-path section comprising:

a straight-path substrate having a surface formed with a plurality of parallel guide grooves and a slit extending across said guide grooves and from said surface to an opposite surface thereof at a predetermined angle;

a first wavelength selective film secured in said slit; and a plurality of straight-path single fibers respectively disposed and secured in said grooves in such a way that optical axes of both halves of each straight-path fiber, between which the first film is sandwiched, are aligned with each other, and said branch-path section comprising:

a branch-path substrate having a surface formed with a plurality of parallel guide grooves and a slit extending across said guide grooves and from said surface to an opposite surface of the same substrate at a predetermined angle;

a second wavelength selective film;

a branch-path ribbon fiber having plural fibers which are disposed and secured in said grooves so that optical axes of both halves of each of the plural fibers between which said second film is sandwiched are aligned with each other;

an outer peripheral surface of each of said plurality of straight-path single fibers being disposed in closed contact with an outer periphery surface of an associated one of the plural fibers of said ribbon fiber.

25. The optical component according to claim 23, wherein said main body comprises a multiple-fiber wavelength division multiplexer/demultiplexer having a straight-path section and a branch-path section, said straight-path section comprising:

a straight-path substrate having a surface formed with a plurality of parallel guide grooves and a slit extending across said guide grooves and from said surface to an opposite surface thereof at a predetermined angle;

a first wavelength selective film secured in said slit; and a plurality of straight-path single fibers respectively disposed and secured in said grooves in such a way that optical axes of both halves of each straight-path fiber, between which the first film is sandwiched, are aligned with each other, and said branch-path section comprising:

a branch-path substrate having a surface formed with a plurality of parallel guide grooves and a polished one end face obliquely extending at a predetermined angle; and a branch-path ribbon fiber secured in said grooves and having one end face obliquely polished together with said branch-path substrate, said one end face of said branch-path ribbon fiber being disposed in closed contact with and secured to outer surfaces of said straight-path single fibers.

26. The optical component according to claim 24, wherein said main body comprises an optical coupler/splitter having a splitting film with a predetermined splitting ratio with respect to an optical signal with at least one wavelength in place of said first wavelength selective film, and having a total reflection film, in place of said second wavelength selective film, for total reflection of optical signal with said at least one wavelength.

27. The optical component according to any one of claims 23–26, wherein said single-fiber input/output means comprises an element selected from a group consisting of a single fiber and a single-fiber ferrule, and said multiple-fiber input/output means comprises an element selected from a group consisting of a ribbon fiber, a multiple-fiber ferrule, and a ribbon fiber whose termination is connected to a multiple-fiber ferrule.

28. The optical component according to any one of claims 23–26, wherein said main body, said single-fiber input/output means and said multiple-fiber input/output means are disposed in the same case.

29. The optical component according to claim 28, wherein said case has a multiple-fiber connector adapter and a single-fiber connector adapter.

30. A method for manufacturing a multiple-fiber optical component with a multiple-fiber/single-fiber conversion function, comprising the steps of:
forming a plurality of parallel shallow guide grooves in a substantially center portion in a surface of a straight-path plate, to obtain a straight-path substrate;
disposing and securing a plurality of straight-path single fibers in said guide grooves;
forming in said surface of said straight-path substrate a slit extending across said straight-path single fibers and from said surface of said straight-path substrate to an opposite surface thereof at a predetermined angle;
fitting and securing a first wavelength selective film in said slit;
forming a plurality of parallel guide grooves in a surface of a branch-path substrate;
disposing and securing a branch-path ribbon fiber in said guide grooves of said branch-path substrate;
forming in said surface of said branch-path substrate a slit extending across said branch-path ribbon fiber and from said surface of said branch-path substrate to an opposite surface thereof at a predetermined angle;
fitting and securing a second wavelength selective film in said slit of said branch-path substrate; and
jointing said branch-path ribbon fiber to outer surfaces of said straight-path single fibers in such a way that optical signal incident to said straight-path single fibers and reflected at said first and second wavelength selective films is propagated along an optical axis of said branch-path ribbon fiber.

31. The method according to claim 30, further comprising the step of polishing said surface of said straight-path substrate in such a way that an outer surface of each of said straight-path single fibers is polished up to a region short of a core of said each straight-path optical fibers, after disposing and securing said first wavelength selective film in said slit of said straight-path substrate.

32. A multiple-fiber optical component having a multiple-fiber/single-fiber conversion function to transmit optical signals between one of optical fibers of at least one multiple-fiber optical cable and at least one single fiber corresponding thereto, comprising:
a main body having at least two multiple-fiber input/output ports; and
a multiple-fiber/single-fiber conversion component, having at least two input/output ports, for executing the multiple-fiber/single-fiber conversion, one of said at least two input/output ports of said multiple-fiber/single-fiber conversion component being connected to one of said at least two multiple-fiber input/output ports of said main body, and at least one single fiber being connected to the remainder of said at least two input/output ports.

33. The optical component according to claim 32, wherein said multiple-fiber/single-fiber conversion component comprises N (N=2, 3, 4, ...) single fibers each having opposite terminations at both ends, the respective one terminations of these fibers being attached together to an N-fiber ferrule at one end and the respective one other terminations of said N single fibers consisting of at least one of a single fibers and/or a single-fiber ferrule connected to a single fiber at the other end.

34. The optical component according to claim 32, wherein said each of said multiple-fiber input/output ports of said main body comprises an element selected from a group consisting of an N-fiber ribbon, an N-fiber ferrule, and an N-fiber ribbon whose termination is attached to an N-fiber ferrule.

35. The optical component according to claim 32, wherein said main body and said multiple-fiber/single-fiber conversion component are disposed in the same case.

36. The optical component according to claim 35, wherein said case has a multiple-fiber connector adapter, serving as a multiple-fiber input/output port of said optical component and being adapted for connection to an external unit, and a single-fiber connector adapter as a single-fiber input/output port of said multiple-fiber/single-fiber conversion component and being adapted for connection to an external unit.

37. The optical component according to any one of claims 32–36, wherein said main body comprises a wavelength division multiplexer/demultiplexer having three N-fiber input/output ports, and said multiple-fiber/single-fiber conversion component is coupled to less than three of said three N-fiber input/output ports of said wavelength division multiplexer/demultiplexer.

38. The optical component according to any one of claims 32–36, wherein said main body comprises an optical coupler/splitter having three N-fiber input/output ports.

* * * * *

UNITED STATES PATENT AND TRADEMARK OFFICE
CERTIFICATE OF CORRECTION

PATENT NO. : 4,900,118

DATED : February 13, 1990

INVENTOR(S) : YANAGAWA et al

It is certified that error appears in the above-identified patent and that said Letters Patent is hereby corrected as shown below:

Title page, right column, under "OTHER PUBLICATIONS":

Change the volume number of Miyauchi reference from "vol. 15" to --vol. 5--.

Signed and Sealed this

Sixteenth Day of June, 1992

*Attest:*

DOUGLAS B. COMER

*Attesting Officer*  *Acting Commissioner of Patents and Trademarks*